(12) United States Patent
Dall'Aglio et al.

(10) Patent No.: US 7,076,882 B2
(45) Date of Patent: Jul. 18, 2006

(54) HEAD AND APPARATUS FOR THE LINEAR DIMENSION CHECKING OF MECHANICAL PIECES

(75) Inventors: Carlo Dall'Aglio, Castello D'Argile (IT); Luciano Ventura, Zola Predosa (IT)

(73) Assignee: Marposs Societa' per Azioni, Bentivoglio (IT)

( * ) Notice: Subject to any disclaimer, the term of this patent is extended or adjusted under 35 U.S.C. 154(b) by 0 days.

(21) Appl. No.: 11/152,391

(22) Filed: Jun. 15, 2005

(65) Prior Publication Data

US 2005/0229419 A1  Oct. 20, 2005

Related U.S. Application Data

(62) Division of application No. 10/347,236, filed on Jan. 21, 2003, now Pat. No. 6,920,698, which is a division of application No. 09/622,890, filed as application No. PCT/EP99/01388 on Feb. 6, 1999, now Pat. No. 6,546,642.

(30) Foreign Application Priority Data

Mar. 13, 1998 (IT) ............................ BO98A0157

(51) Int. Cl.
*G01B 5/20* (2006.01)
(52) U.S. Cl. ...................... 33/551; 33/561; 33/832
(58) Field of Classification Search ........... 33/533, 33/546, 549, 551, 553, 554, 555, 559, 561, 33/832, 833, 834, 501.02, 501.03, 504.04
See application file for complete search history.

(56) References Cited

U.S. PATENT DOCUMENTS

| | | | |
|---|---|---|---|
| 3,742,610 A * | 7/1973 | Calame | 33/561 |
| 3,875,671 A | 4/1975 | Vetter | 33/559 |
| 4,261,211 A | 4/1981 | Haberland | 74/5 F |
| 4,279,079 A | 7/1981 | Gamberini et al. | |
| 4,341,019 A | 7/1982 | Possati | |
| 4,348,814 A | 9/1982 | Possati et al. | |
| 4,377,911 A | 3/1983 | Iida et al. | 33/561 |
| 4,385,444 A | 5/1983 | Possati et al. | |

(Continued)

FOREIGN PATENT DOCUMENTS

DE    29 15 574    10/1980

(Continued)

*Primary Examiner*—R. Alexander Smith
(74) *Attorney, Agent, or Firm*—Dickstein Shapiro Morin & Oshinsky LLP

(57) ABSTRACT

A head for the linear dimension checking of mechanical pieces including a casing, an arm carrying a feeler for touching the mechanical piece to be checked, a fulcrum for enabling displacements of the arm with respect to the casing and a transducer for providing signals depending on the position of the arm with respect to the casing. Various components of the head can be adjusted and/or replaced from the exterior of the casing. The transducer is of the inductive, half-bridge type, with multiple windings. An integral element for the electric connection to a processing unit includes the windings of the transducer, a cable and a connector. A checking apparatus, including at least a gauging or measuring head, includes a stationary structure and at least a support structure for the head, coupled to the stationary structure in an adjustable and removable way.

13 Claims, 18 Drawing Sheets

U.S. PATENT DOCUMENTS

| | | | |
|---|---|---|---|
| 4,389,786 A * | 6/1983 | Sakata et al. .................. 33/561 |
| 4,409,737 A | 10/1983 | Golinelli |
| 4,417,400 A | 11/1983 | Dall'Aglio |
| 4,441,257 A | 4/1984 | Golinelli et al. |
| 4,571,839 A | 2/1986 | Burton |
| 4,647,075 A | 3/1987 | Vargo |
| 5,054,205 A | 10/1991 | Danielli |
| 5,135,410 A | 8/1992 | Kawase et al. |
| 5,157,845 A | 10/1992 | Possati et al. |
| 5,309,755 A | 5/1994 | Wheeler |
| 5,324,210 A | 6/1994 | Brickley |
| 5,330,411 A | 7/1994 | Fujitani et al. |
| 5,445,530 A | 8/1995 | Inoue et al. |
| 5,674,086 A | 10/1997 | Hashizawa et al. |
| 5,746,003 A | 5/1998 | Baruchello |
| 5,979,070 A * | 11/1999 | Lau ............................ 33/559 |
| 6,256,898 B1 | 7/2001 | Trionfetti .................... 33/555.1 |
| 6,269,546 B1 | 8/2001 | Ventura |
| 6,295,866 B1 * | 10/2001 | Yamamoto et al. ........... 73/105 |
| 6,546,642 B1 * | 4/2003 | Dall'Aglio et al. ........... 33/551 |
| 6,901,678 B1 * | 6/2005 | Kubota ........................ 33/551 |
| 6,920,698 B1 * | 7/2005 | Dall'Aglio et al. ........... 33/551 |

FOREIGN PATENT DOCUMENTS

| | | |
|---|---|---|
| EP | 0 155 662 | 9/1985 |
| EP | 0 337 671 | 10/1989 |
| EP | 0 377 056 | 7/1990 |
| EP | 0 544 477 | 6/1993 |
| EP | 0 806 627 | 11/1997 |
| WO | WO 98/20297 | 5/1998 |

* cited by examiner

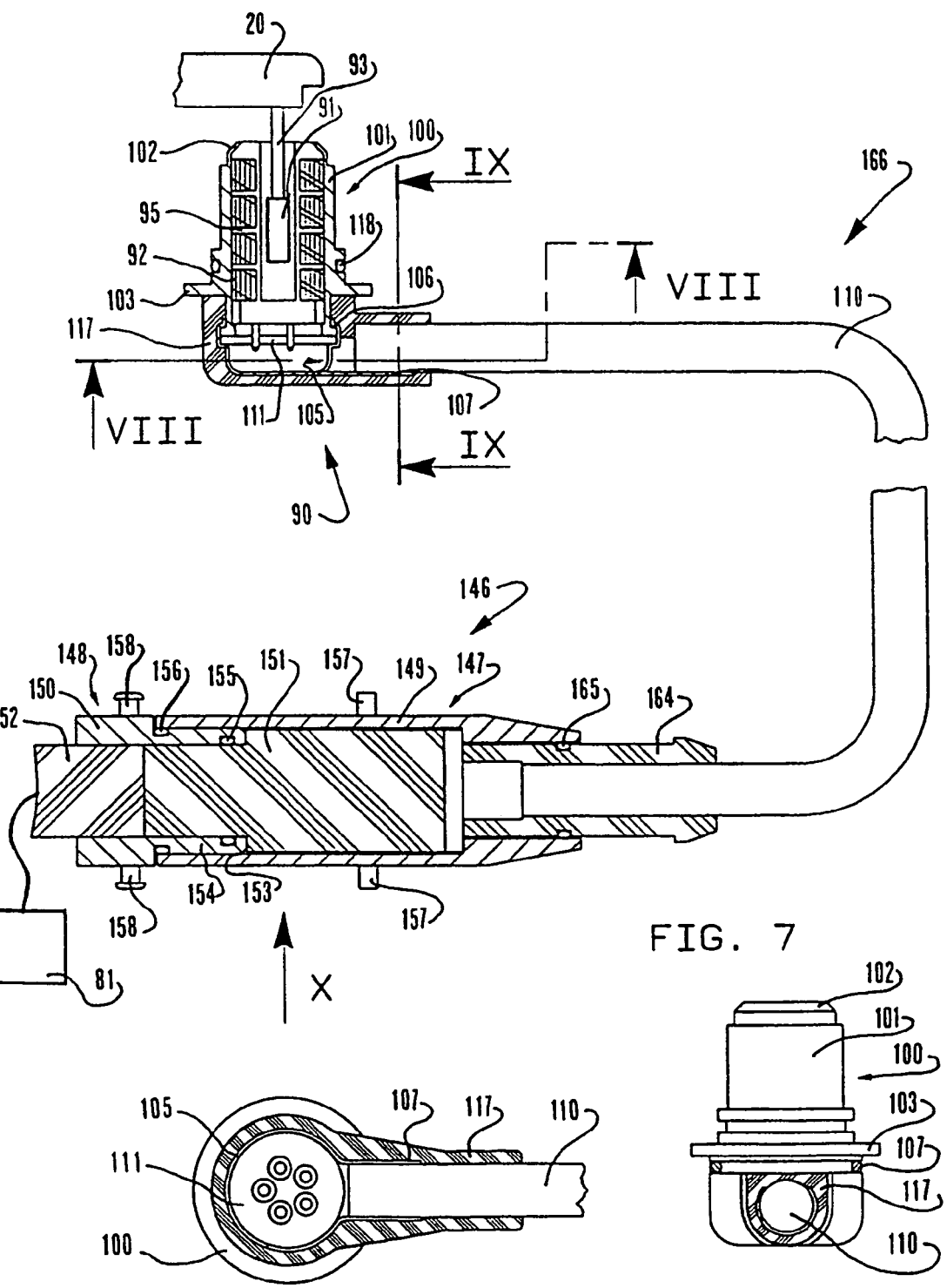

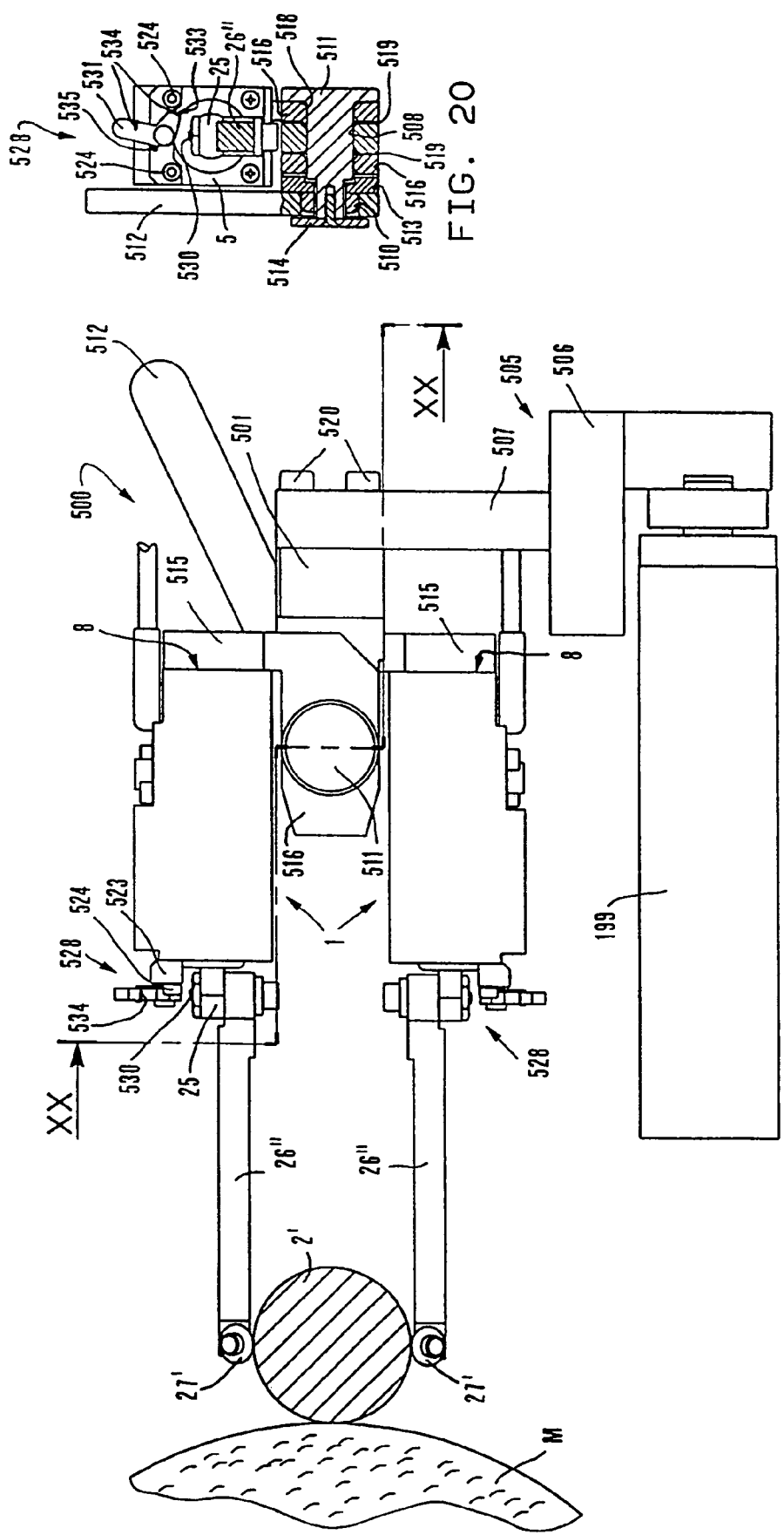

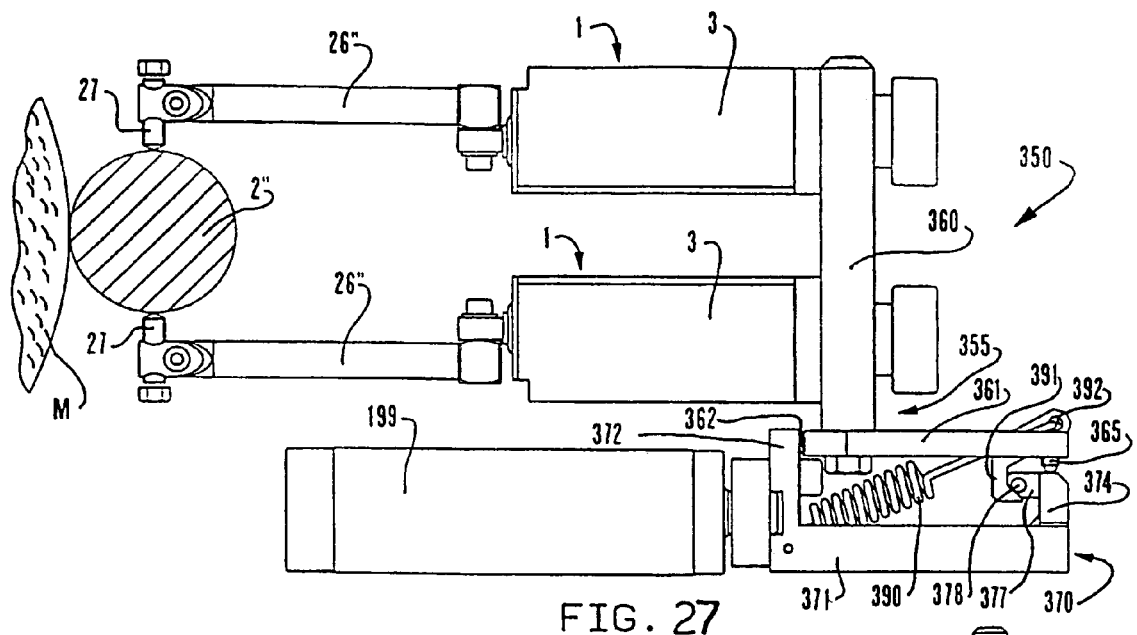
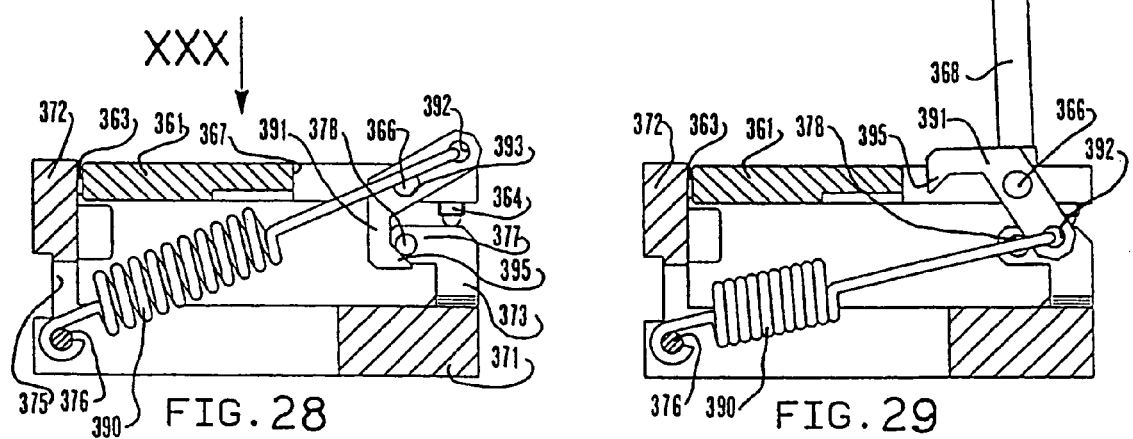
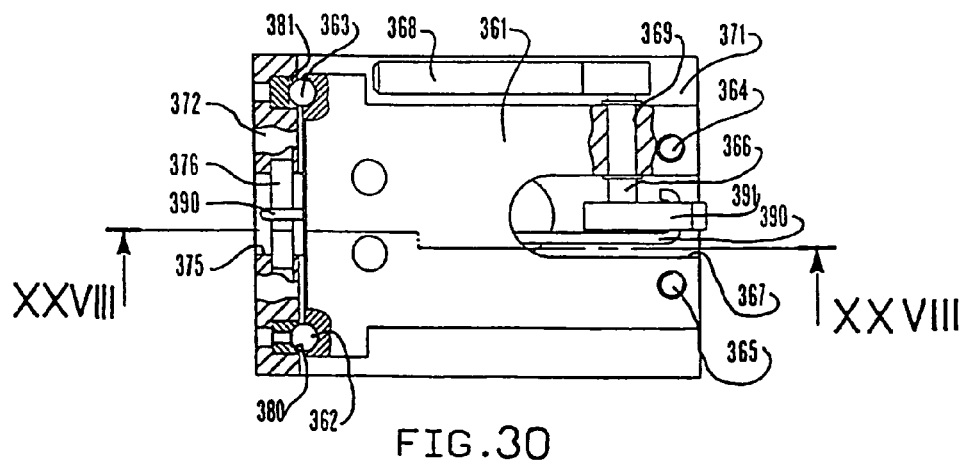

HEAD AND APPARATUS FOR THE LINEAR DIMENSION CHECKING OF MECHANICAL PIECES

CROSS REFERENCE TO RELATED APPLICATIONS

The present application is a divisional of application Ser. No. 10/347,236, filed on Jan. 21, 2003, now U.S. Pat. No. 6,920,698, which is a divisional of application Ser. No. 09/622,890, filed on Aug. 24, 2000, now U.S. Pat. No. 6,546,642, which is a 371 of PCT/EP99/01388, filed Feb. 6, 1999, the entire disclosures of which are incorporated herein by reference.

TECHNICAL FIELD

The present invention relates to a head for the linear dimension checking of a mechanical piece, including a support structure that defines a longitudinal geometric axis, and an arm-set, movable with respect to the support structure.

The invention also relates to an apparatus for the linear dimension checking of mechanical pieces, including at least a head for the linear dimension checking of mechanical pieces and a support and reference system, with a substantially stationary structure, for supporting and locating the head in a determinate checking position.

Moreover, the invention relates to a method for the linear dimension checking of a mechanical piece, by means of an apparatus with at least a gauging head, including a zero setting phase carried out on a master piece, for displacing the head to a definite checking position, and a checking phase.

Furthermore, the invention relates to an inductive type transducer for use in heads for the linear dimension checking with a support structure and an arm, movable with respect to the support structure, for generating electric signals depending on the position of the arm with respect to the support structure, the transducer including windings and a core, made from ferromagnetic material, housed within the windings and movable with respect to them, the transducer further including a hollow support with a first housing and a spool, arranged in the first housing, with annular seats for the windings.

The invention still further relates to a connector for the electric connection of two devices, including a first and a second element, each of the two being electrically connected to one of the two devices, and a locking device between the first and the second element.

The invention also relates to an apparatus for the linear dimension checking of a mechanical piece, with a gauging head for cooperating with the piece, a transducer at least partially included in the gauging head for generating electric signals indicative of the dimensions of the piece, a processing unit, and electric coupling means between the head and the processing unit.

BACKGROUND ART

There are known many types of gauging, or measuring, heads for the inspection of mechanical pieces in benches, transfer lines or in the course of the machining in machine tools in applications of the so-called "in-process" type.

Even though the known heads ensure good performance insofar as the repeatability and the reliability are concerned, they are generally dedicated to specific types of applications and do not allow a broad flexibility of use.

In other circumstances, even though the heads would be suitable for a number of applications, they require lengthy, expensive and toilsome retooling operations.

The transducer devices of the known heads, for example of the linear voltage differential transformer, or half-bridge type, with reciprocally movable windings and core have a linear performance in an extremely limited area of displacement between the core and the windings, hence permitting limited measuring ranges. Moreover, these transducer devices have a structure that is delicate and particularly sensitive to temperature variations that cause undesired drifts, known as "thermal drifts", in the course of the operation of the heads.

The known heads also include cables with electric wires that enable the sending of signals from the associated transducers to the processing units, and connectors at the free end of the cables. The connectors of the known heads have elements intended to be coupled to each other, for example, by means of a threaded coupling, that requires particular care on behalf of the operator for achieving the appropriate locking and sealing.

There are also known apparatuses comprising frames for supporting these heads, for example, supports for supporting and referring a pair of heads in applications for the diameter checking. The heads can be coupled to the support in an adjustable way, both reciprocally and with respect to the support. Apparatuses of this type are utilized, for example, for the diameter checking of pieces in the course of the machining in machine tools, more specifically, in grinding machines. The component parts of the apparatus, more specifically the gauging heads, can be subject to accidental and undesirable collisions, frequently occurring especially in the workshop environment where there are applications of the "in-process" type. These collisions can alter the checking position of the heads, besides cause damage to the actual heads.

DISCLOSURE OF INVENTION

An object of the present invention is to provide gauging or measuring heads for the linear dimension checking of mechanical pieces that guarantee high standards of repeatability and accuracy, are particularly reliable, versatile and inexpensive, hence overcome the disadvantages of the known heads. It is another object of the invention to provide component parts for gauging heads, in particular transducers and connectors, that contribute to improve the performance of the heads and reduce their manufacturing costs, and make their use extremely simple and flexible.

Yet another object of the invention is to provide checking apparatuses that utilize gauging or measuring heads that, while guaranteeing high standards of repeatability and accuracy, are particularly safe and flexible in use, and need only easy and quick set-up operations.

It is also object of the present invention to provide a method for the linear dimension checking implemented by means of an apparatus with at least a gauging or measuring head that is particularly simple and flexible in use.

A still further object of the invention is to provide a checking apparatus with at least a gauging or measuring head and means for the connection to a processing unit that are particularly reliable, compact and can be easily and quickly replaced.

These and other objects are achieved by heads, component parts, apparatuses and a checking method as defined in the claims provided at the end of the description.

The heads, the apparatuses, the component parts and the method according to the invention provide particular advantages, as described in the following description.

BRIEF DESCRIPTION OF THE DRAWINGS

The invention is now described in more detail with reference to the enclosed sheets of drawings, given by way of non limiting example, wherein:

FIG. 7 is an enlarged scale view of a component partially shown in FIG. 2;

FIGS. 8 and 9 are partly cut-away cross-sectional views of the component shown in FIG. 7, along the lines VIII—VIII and IX—IX of FIG. 7, respectively;

FIG. 19 is a lateral view of a second apparatus according to the invention;

FIG. 20 is a partly cut-away cross-sectional view of the apparatus shown in FIG. 19, along the line XX—XX of FIG. 19;

FIG. 27 is a side view of a fifth apparatus according to the invention, shown in the course of the checking of a piece;

FIG. 28 is an enlarged scale, longitudinal cross-sectional view of a detail of the apparatus shown in FIG. 27, taken along the line XXVIII—XXVIII of FIG. 30;

FIG. 29 is a longitudinal cross-sectional view corresponding to the view of FIG. 28, according to another working position of the apparatus;

FIG. 30 is a top view, with some elements shown cross-sectioned, of the detail in FIG. 28, when viewed in the direction of the arrow XXX in FIG. 28;

BEST MODE FOR CARRYING OUT THE INVENTION

Figure 1:
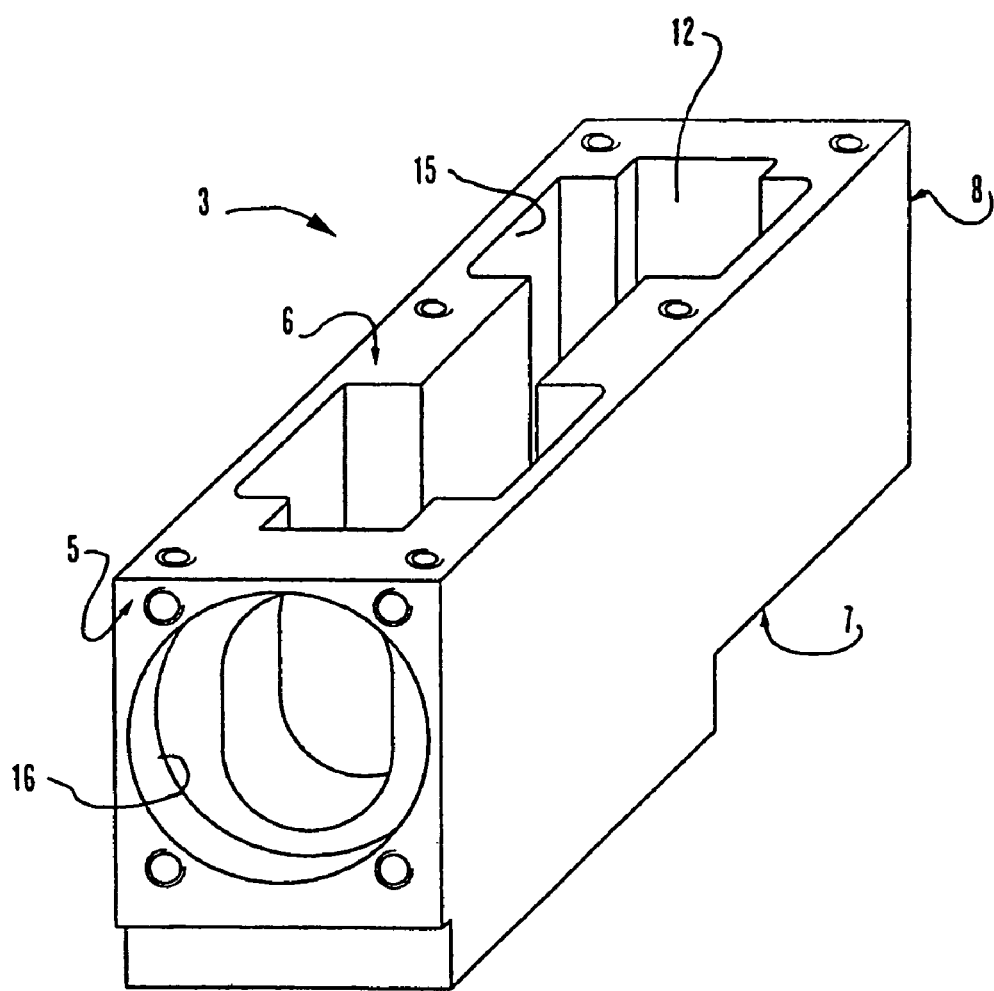
FIG. 1 is an axonometric view of the casing of a head according to the invention.

The head shown in FIGS. 1–6, more specifically a gauging head 1, comprises a support and protection structure with a steel casing 3, substantially of a prismatic shape, in particular a parallelepipedon shape, that defines a longitudinal geometric axis.

The casing 3 has a recess 12, with a substantially longitudinal arrangement, and a front face 5, an upper face 6, a lower face 7 and a rear face 8 with holes and openings for access to the recess 12. In particular, an elongate opening 15 is defined in the upper face 6, and a central opening 16 is defined in the front face 5.

A movable arm-set comprises an arm 20 that is partially housed in recess 12 of casing 3 and arranged substantially parallel to the longitudinal geometric axis of casing 3. The arm 20 includes a first end portion 21, located within casing 3, with two transversal wings 22 and 23 (shown in FIG. 4), an intermediate portion 24 and a second end portion 25, that traverses the central opening 16 of the front face 5 and carries, at the exterior of the casing 3, a support 26 for a feeler 27.

A fulcrum 30 (also detailedly shown in an enlarged scale in FIG. 6) is coupled to casing 3 and movable arm 20 for enabling limited rotational displacements of arm 20 about a transversal axis. It comprises a deformable element consisting of three steel laminae 31, 32 and 33, permanently secured to two blocks 34 and 35 made of, for example, a zinc alloy. Die-casting is a process adopted for obtaining this permanent fixing between elements made of different materials, even though there can be foreseen other types of processes (for example, welding).

The die-casting process for permanently fixing the laminae 31, 32 and 33 to blocks 34 and 35 is achieved by inserting the laminae 31, 32 and 33 in a die in which there is thereafter injected the melted material required for achieving the blocks 34 and 35. Thus, the laminae 31, 32 and 33 remain fixed to this material once it cools down. Furthermore, the laminae 31, 32 and 33 may define holes—in the areas intended to remain immersed in the melted material—that furtherly guarantee the fixing stability.

When the fulcrum 30 is under rest conditions, the two blocks 34 and 35 are substantially parallel with respect to each other and the laminae 31, 32 and 33 form, for example, 45 degree angles with blocks 34 and 35. The laminae 31 and 33 are substantially coplanar, whereas lamina 32 forms an angle of approximately 90 degrees with the other two laminae 31 and 33. In substance, the laminae 31, 33 on the one side, and 32, on the other, lie in two planes (for example, two mutually perpendicular planes) of a sheaf of planes defined by a straight line that represents the axis of rotation of arm 20.

Figure 6:
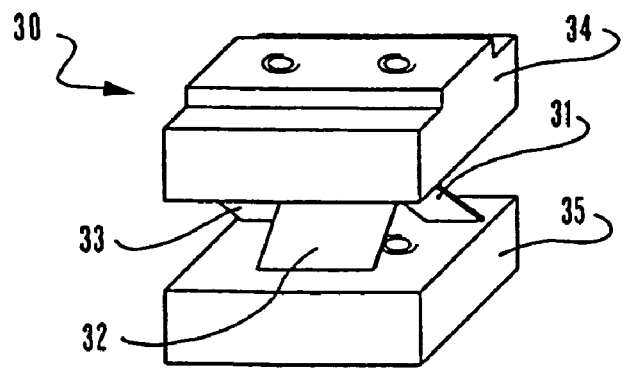
FIG. 6 is an enlarged scale axonometric view of a component of the head according to the invention.
Figure 2:
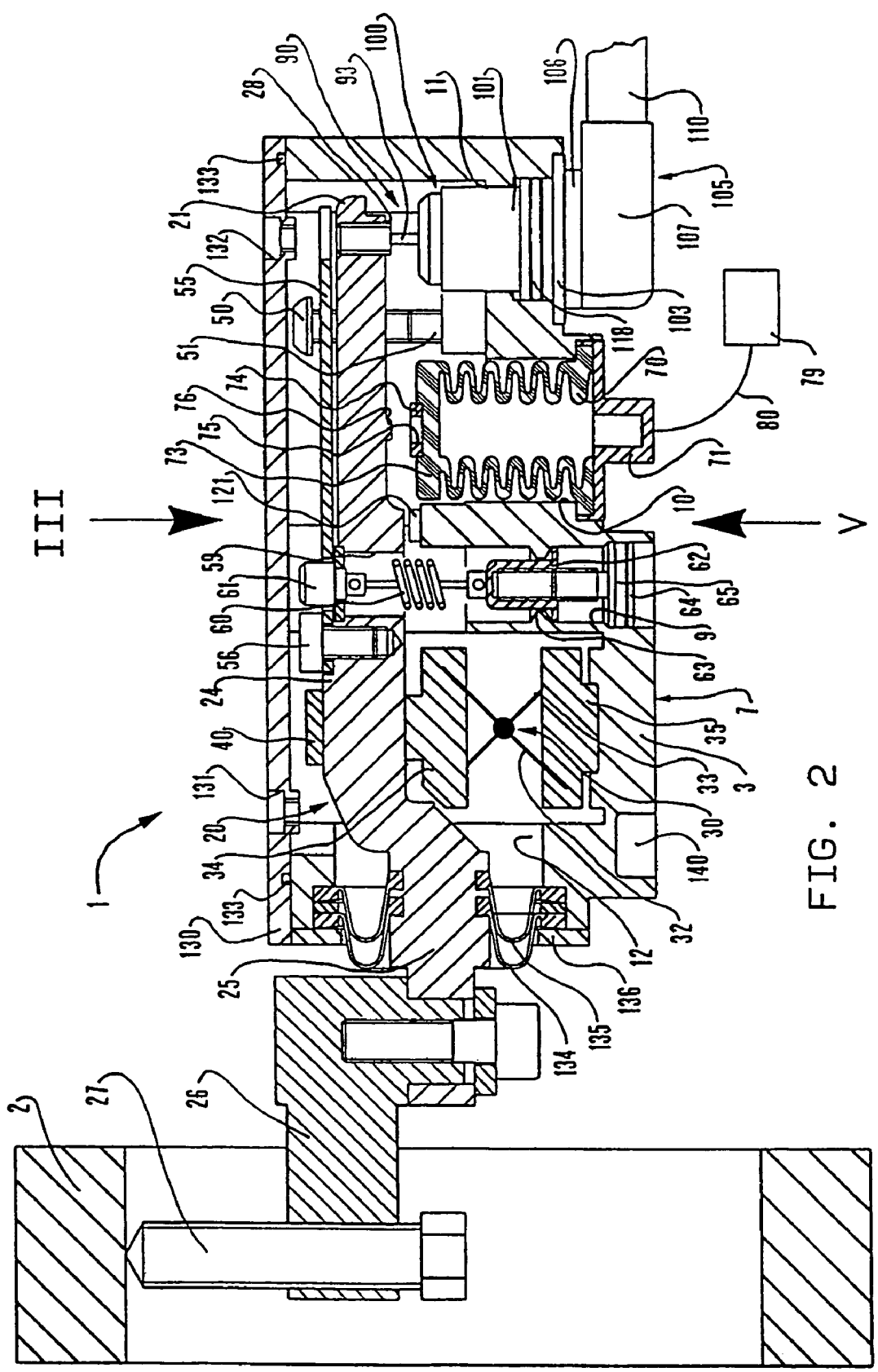
FIG. 2 is a longitudinal cross-sectional view of a head according to the invention, comprising the casing of FIG. 1, with some details shown in view and in the course of the checking of a piece.
Figure 3:
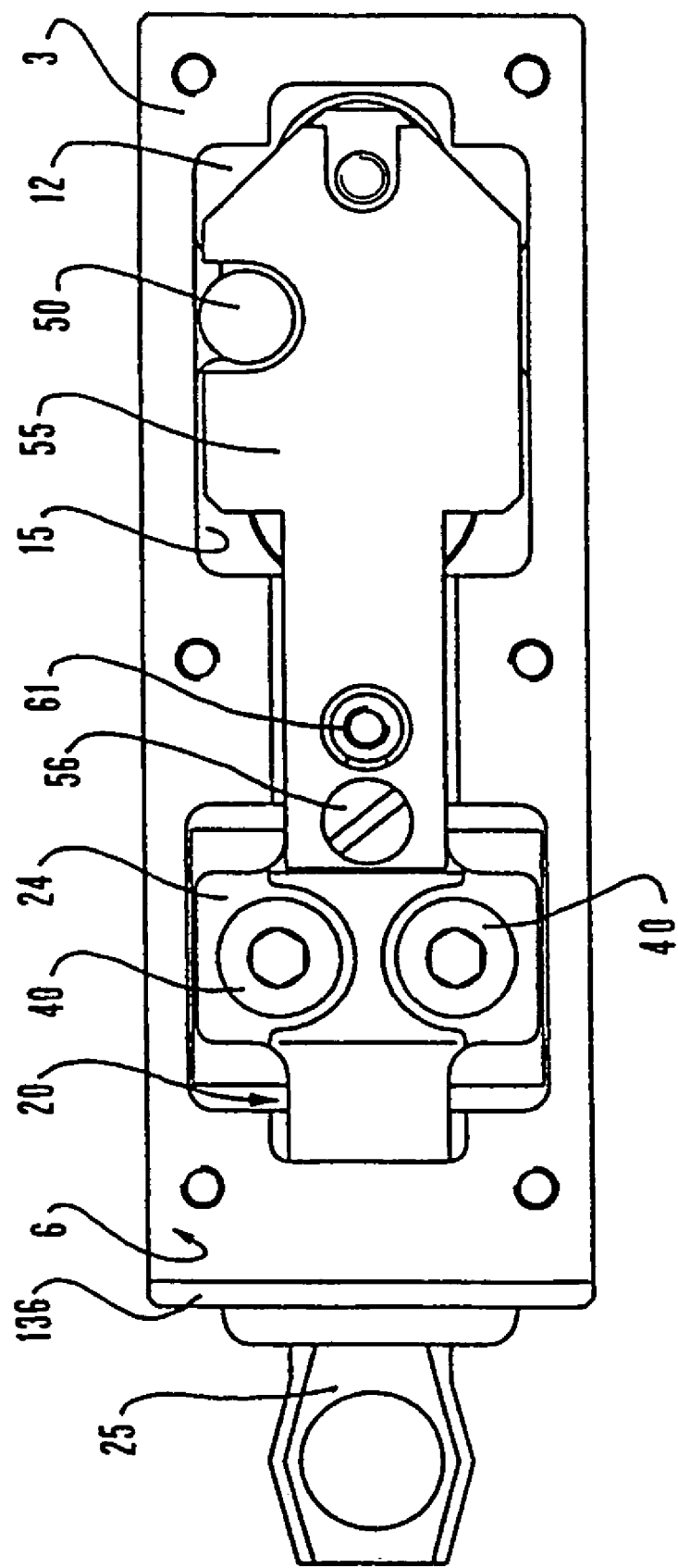
FIG. 3 is a view of the head shown in FIG. 2, taken along the direction indicated by arrow III in FIG. 2, with some elements omitted for the sake of simplicity, in particular the cover 130, the feeler 27 and the associated support 26.
Figure 5:
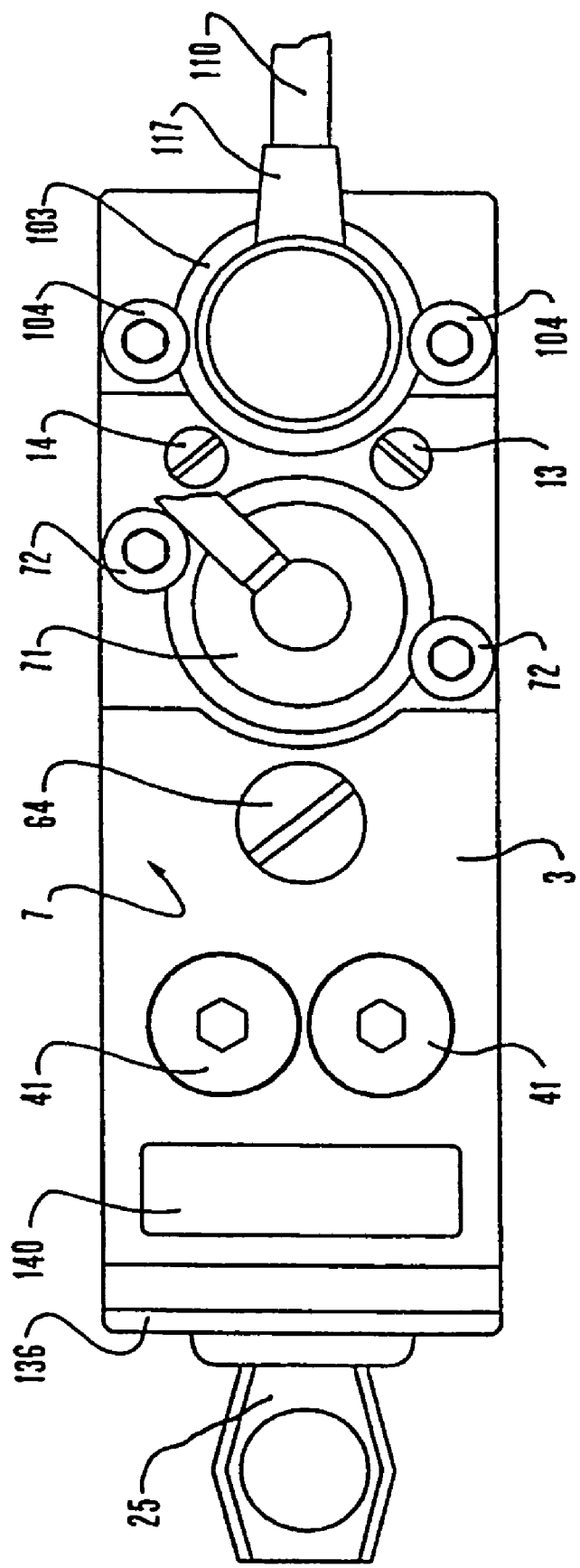
FIG. 5 is a view of the head shown in FIG. 2, taken along the direction indicated by the arrow V in FIG. 2.

Block 34 is coupled to the intermediate portion 24 of arm 20 by means of two screws 40, while block 35 is coupled to an inner surface of casing 3 at a position corresponding to face 7, by means of two other screws 41 (shown in FIG. 5). Block 34, shown in FIGS. 2 and 6, is so shaped that the portion for the coupling to arm 20 has a quite limited extension in a longitudinal direction, thereby ensuring a better performance of fulcrum 30 by minimizing the transmission of strains from arm 20 to fulcrum 30.

The structure and the arrangement of fulcrum 30 enable arm 20 to perform limited but accurate rotation displacements about the formerly mentioned rotation axis, that is perpendicular to the longitudinal geometric axis of casing 3 and parallel to the upper and the lower faces 6 and 7, respectively.

Figure 4:
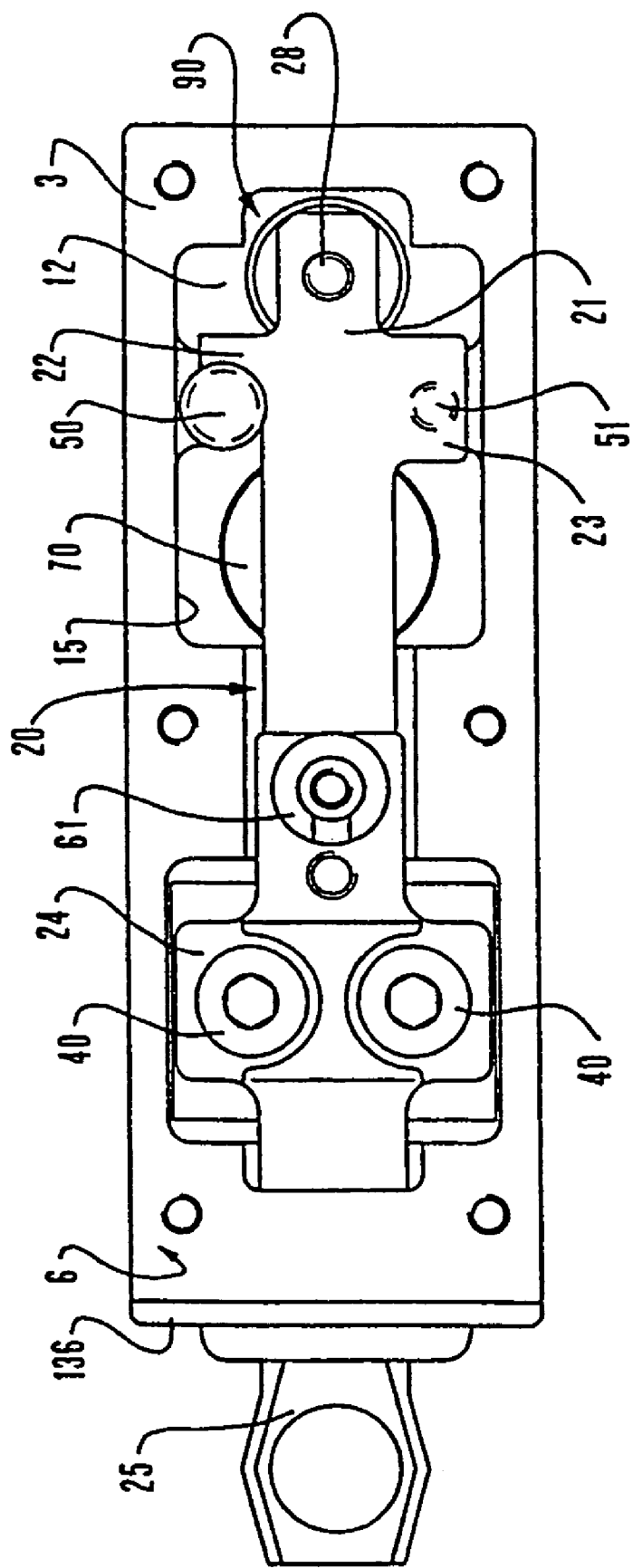
FIG. 4 is a view of the head shown in FIG. 2, corresponding to the one shown in FIG. 3, in which the fin 55 and the associated locking screw 56 are also omitted.

Mechanical limiting devices comprise limit-stop elements fixed in recess 12 of casing 3, adapted for cooperating with the upper and lower surfaces of the transversal wings 22 and 23, respectively, for limiting the rotation displacements of arm 20 in both directions. More specifically, a screw 50 is screwed into recess 12 at the lower face 7 of casing 3 and traverses an appropriate opening in wing 22, in such a way so that the rotation displacements of movable arm 20, in a counter-clockwise direction (with reference to FIG. 2) are limited by contact occurring between the upper surface of wing 22 and the head of screw 50. A threaded element, or dowel, 51 is shown in FIG. 2 even though it lies at the exterior of the cross-sectional plane of FIG. 2, and is also shown in FIG. 4 with a dashed line. Dowel 51 is also fixed in recess 12 at the lower face 7 of casing 3 and has a free end that, upon touching a lower surface of wing 23, limits the rotation displacements of movable arm 20 in a clockwise direction, with reference to FIG. 2. The position of screw 50 and that of dowel 51 can be adjusted by accessing through suitable holes, located in the lower face 7 of casing 3 and sealed by associated caps 13 and 14 (shown in FIG. 5).

A flat, elongate and shaped element, or fin, 55 is coupled to arm 20 by means of a screw 56. As shown in FIG. 2, arm 20 has a shaped profile with protruding surface portions. In particular, the coupling of the fin 55 is made at an end portion of fin 55 and at a protruding surface portion of arm 20 near the coupling area of fulcrum 30. In this way, fin 55 positions itself in a plane substantially parallel to the upper surface (with reference to FIG. 2) of the first end portion 21 of arm 20.

A thrust device comprises a return spring 60, coupled to movable arm 20 and casing 3 by means of associated hooking and adjustment devices, for urging feeler 27 against the surface of a mechanical piece 2 to be checked. More specifically, these hooking and adjustment devices comprise a first and a second hooking element 61 and 62, respectively, secured to the ends of spring 60 and coupled to the movable arm 20 and the casing 3, respectively.

In more detail, the first hooking element 61 has a substantially cylindrical shape with an enlarged portion that cooperates with an associated seat of arm 20 at the entrance of a through hole 59 and a portion that carries the associated end of spring 60 and is housed in through hole 59. The tractive force of spring 60, adjustable as hereinafter described, ensures the cooperation between the first hooking element 61 and the arm 20.

The second hooking element 62 has a substantially prismatic external surface (more particularly, a square cross-section) and an axial threaded hole, and houses in a seat 9 on the lower face 7 of casing 3. Seat 9 has a cylindrical cross-section and a guide neck 63 with a square cross-section for preventing axial rotations of the second hooking element 62. Furthermore, the hooking and adjustment devices comprise an adjustment screw 64 coupled to the axial threaded hole of the second hooking element 62 and housed in seat 9 in such a way that the head of the screw 64 is arranged in an enlarged cross-section portion, abutting against transversal surfaces of seat 9. The guiding action of neck 63 enables to apply to the hooking element 62 translation displacements (for varying the bias of spring 60) by operating—from the exterior of the casing (as shown in FIG. 5)—to rotate the head of adjustment screw 64. An annular gasket 65 is arranged between the head of the screw 64 and the entrance of seat 9 for sealing seat 9.

A pneumatically-operated, retraction device, for bringing arm 20 to a pre-set inoperative position, comprises a bellows 70, housed in a through seat 10 on the lower face 7 of casing 3. The bellows 70 is made from plastic material, for example polyurethane, but it can be made from rubber or metal. The bellows 70, that can be inserted in seat 10 or removed, from the exterior of casing 3, has an open and enlarged end for housing in a recess at the entrance of the seat 10, at face 7. A substantially flat cover 71 is also inserted in seat 10 and urges the end of bellows 70 for sealing seat 10. Cover 71 is coupled to casing 3 by means of two screws 72 that lock diametrically opposite portions of its rim (FIG. 5).

The opposite end of bellows 70 is free and has a closure wall 73 on the external surface of which there is coupled, for example glued, in a central area, an annular limit-stop element 74. A cylindrical projecting part 76, integral with arm 20, has dimensions such as to cooperate with a cylindrical seat 75 of the annular limit-stop element 74. Cover 71 has a through hole coupled with the conduits of a known pneumatic circuit that comprises a source of compressed air and associated conduits, schematically shown in FIG. 2 and identified by reference numbers 79 and 80, respectively.

An inductive transducer 90, of the "half-bridge" type with multiple windings, shown in view in FIG. 2, and in an enlarged scale in the cross-section views of FIGS. 7, 8 and 9, comprises a pair of windings 92, each divided into two sections, and a core 91 made of ferromagnetic material. The core 91 is secured to a stem 93 that is coupled to arm 20 in an adjustable way. More specifically, stem 93 is screwed into a threaded hole 28 located at the end portion 21 of arm 20.

Each section of the windings 92 is housed in one of the four annular seats of a spool 95 made from a material that has a particularly low sensitivity to thermal variations (for example "liquid crystals" or LCP—Liquid Crystal Polymer).

The coupling of the windings 92 to the spool 95 does not foresee the use of glue, thereby facilitating the assembly operations and avoiding any possible negative effects due to thermal expansions that glue is subject to.

The spool 95 is coupled to a hollow support 100, more specifically is arranged at the interior of a first steel housing, or liner, 101, between internal limit-stop surfaces at the ends of the liner 101. In more detail, in the illustrated arrangement, the position of spool 95 is locked by a free end rim 102 of liner 101 suitably bent by mechanical machining against a substantially truncated-cone end surface, of spool 95. This type of coupling is particularly simple, reliable and easily automated. The reliability is improved especially with respect to the known devices in which, owing to the fact they require additional materials—as bonding agents—for their coupling, and as these materials are subject to undesired changes in volume, the thermal variations that the device undergoes can cause displacements among the components of the transducer.

A second housing 105—made, for example, of brass—of the hollow support 100 for spool 95 has two parts arranged in substantially perpendicular directions. One part 106 is coupled to the liner 101 by means of bent portions, the other part 107 has a C-shaped cross-section (shown in FIG. 9) and locks the end of a cable 110 for electric wires not shown in the figures. A support plate 111 is locked between the first and the second housing (101 and 105), respectively, of the hollow support 100 and carries an integrated circuit to which there are connected, on the one side the windings 92 and on the other the electric wires of cable 110.

A protection 117 protects the end portion of cable 110, the second metal plate housing 105 and an end portion of liner 101.

The liner 101 is housed in a through seat 11 on the lower face 7 of casing 3, and has—at the exterior—a flange 103 with a surface that, by cooperating with a corresponding surface at the entrance of seat 11, defines the position and enables the coupling of the hollow support 100 by means of two screws 104 that lock diametrically opposite areas of the flange 103 (as shown in FIG. 5). Moreover, the external surface of liner 101 has a seat for a toroidal-shaped gasket, or "O-ring", 118 that, by remaining pressed between liner 101 and the internal surface of seat 11, guarantees the coupling sealing.

The liner 101 can have a different shape with respect to the one illustrated, for example, flange 103 may not be included. In this case the fixing and the adjusting of its position in seat 11 can be carried out, for example, by means of a friction screw that—by traversing a hole at the rear face 8 of casing 3 (not shown in the figures)—touches the surface of the liner 101 and locks it in the desired position.

The arrangement of the components of the inductive transducer 90 is such that the core 91 is housed at the interior of the windings 92, and can perform (together with stem 93) limited, substantially translational, displacements when arm 20 displaces.

The protection 117 can be achieved by an over-moulding process. This process is per se known and substantially consists in a moulding of plastic material, for example polyurethane, to embrace the parts intended to be coated (i.e. in the illustrated arrangement the end part of liner 101, the steel plate housing 105 and an end of cable 110). This process achieves, in substance, a single, non-dismountable piece. Because the sheath of cable 110 is also made of polyurethane, the over-moulding process provides a fusion with protection 117 that guarantees the sealing of the coupling.

An additional thrust device comprises two permanent magnets 121 (only one is shown in FIG. 2), fixed in recess 12 of casing 3 at the lower face 7, with opposite polarity, placed side by side in a direction that is substantially parallel to the axis of rotation defined by fulcrum 30. The magnets 121 face, with opposite polarities, areas of the arm 20, for example near the return spring 60, and apply to arm 20 (made of ferromagnetic material) a magnetic tractive force that adds to the action of spring 60 for urging feeler 27 towards piece 2 to be checked. Since the two magnets 121 are arranged with opposite polarities, the magnetic flux that they generate loops them—through the corresponding areas of arm 20—and the areas of casing 3 to which they are coupled, and does not apply any action to the other component parts of head 1.

The recess 12 can be filled with a viscous liquid, in particular oil (for example, silicon oil, characterized by a high and substantially constant viscosity) intended for cooperating with the transversal surfaces of fin 55, in the course of the displacements of arm 20, for damping these displacements. Depending on the requirements of the specific application of head 1, the damping effect, generally required for the checking of pieces with grooved surfaces, can be easily modified by replacing fin 55 with another fin that has a different shape, in particular transversal surfaces that have a different extension.

The specific coupling of the fin 55, to an end portion and at a zone of arm 20 near fulcrum 30, ensures that the forces generated by the oil cooperating with the fin 55 do not produce undesired strains on delicate component parts of head 1, in particular core 91 of the transducer coupled to arm 20, and that they substantially discharge at the rotation axis, hence avoiding to negatively affect the operation of the head 1.

The support and protection structure comprises a cover 130 that is secured, by means of screws not shown in the figures, to the upper face 6 of casing 3 for sealing the opening 15 that provides access to recess 12. The cover 130 has two holes with associated caps 131 and 132 for the insertion of the damping oil in recess 12. One of the holes and its associated cap 132 are arranged at the stem 93 carrying the core 91 of transducer 90 thereby permitting to operate from the exterior of the casing 3 for setting the position of core 91 at the interior of the windings 92. A toroidal-shaped gasket 133 (or "O-ring") is clamped between the cover 130 and the casing 3 and achieves the coupling sealing between cover 130 and casing 3.

Two flexible, tubular-shaped, sealing gaskets 134 and 135 are fixed in a known way in annular seats of arm 20 and casing 3 at the central opening 16.

The gaskets 134 and 135 are made from a particular type of rubber that is abrasion-proof and high temperature-resistant (for example, HNBR, or hydrogenated nitrile) for protecting the interior of head 1 from swarf, that could cause damage.

A cover 136 is coupled to the front face 5 of the casing, for example, by means of screws, not shown in the figures.

An electronic programmable identifier, or "transponder", 140 is housed in a seat in the lower face 7 of casing 3. The transponder 140 comprises a radiofrequency identification system of a known type that enables, with the aid of appropriate instruments (for example a magnetic read/write unit connected with a processing unit), to insert and detect data identifying head 1 (for example a code number), and/or other data of other nature (for example adjustments made in head 1, or information relating to operations for the technical assistance).

Figure 10:
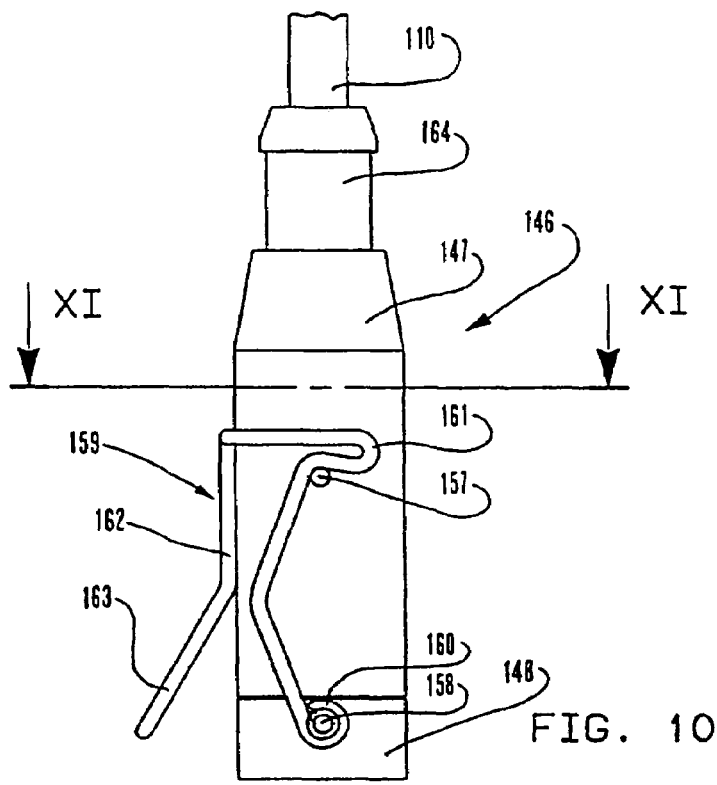
FIG. 10 is a partly cut-away side view, according to a different orientation, of the component of FIG. 7, along the direction indicated by the arrow X in FIG. 7.
Figure 11:
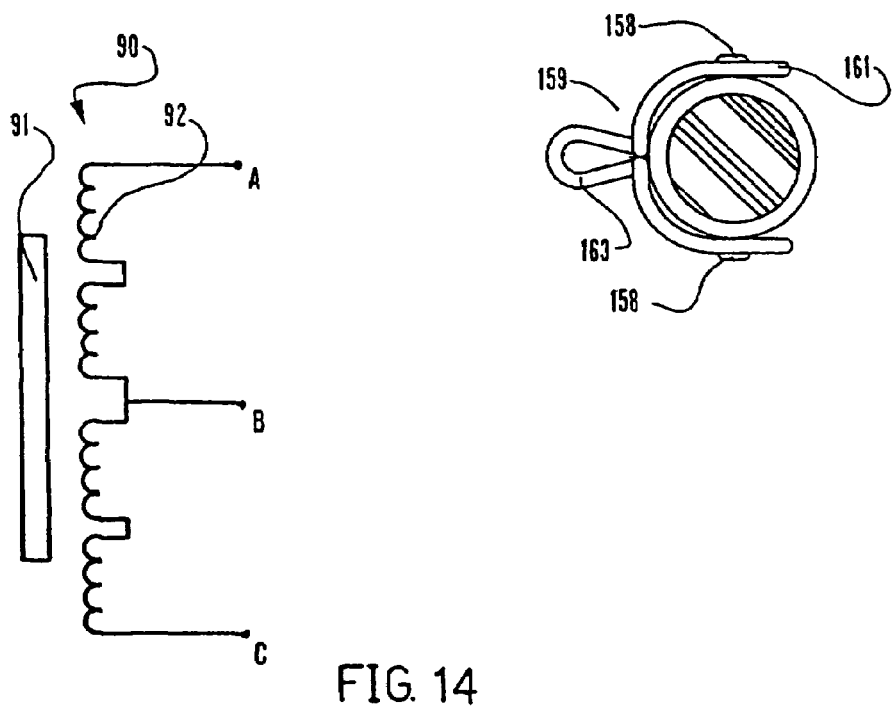
FIG. 11 is a partly cut-away cross-sectional view of the component shown in FIG. 10, along the line XI—XI of FIG. 10.

The electric wires of cable 110, that—as previously described—are connected to windings 92, have opposite ends coupled to a first element 147 of a connector 146, shown in FIGS. 7, 10 and 11. A second element 148 of connector 146 is connected, in a known way and not shown in the figures, with a processing unit 81, and coupled to the first element 147 for featuring the electric connection between the inductive transducer 90 and the processing unit 81.

The first and the second element 147 and 148 of connector 146 have housings 149 and 150 and central cylinder-shaped elements 151 and 152, respectively, that carry conductor terminals of a known type (for example plugs and sockets, not shown in the drawings for the sake of simplicity and clarity) cooperating with one another for achieving the electric connection. A portion of element 152 with smaller diameter and an internal surface of housing 149 define a hollow cylindrical seat 153 that houses a corresponding end portion with a smaller cross-section 154 of housing 150. Two annular gaskets, or "O-rings", 155 and 156 are partially housed in annular seats at the end portion 154 of housing 150 and pressed against the internal surfaces of seat 153 for achieving the coupling sealing between the elements (147 and 148) of connector 146.

The housings 149 and 150 for the components of connector 146 have substantially cylindrical external surfaces and a first and a second pair of pins 157 and 158, respectively, each protruding from its associated external surface and aligned in a diametral direction. A rapid locking/unlocking device between the elements 147 and 148 of connector 146 comprises a shaped elastic locking element 159 (shown in FIGS. 10 and 11 only), made, for example, from bent steel wire for springs, with a substantially symmetric shape with respect to a longitudinal plane, with two end slots 160 coupled to pins 158, two bent hooking portions 161 for cooperating in an elastic way with gripping surfaces of pins 157, and a central connecting portion 162 located between the locking portions. The connecting portion 162 is suitably bent for defining an actuation lever 163 that on the one side contacts the surface of the first element 147 and on the other side has a bent connecting end arranged apart from that surface.

In the locking arrangement shown in FIGS. 10 and 11, the elastic thrust applied by the shaped, element 159 to the pairs of pins 157 and 158 keeps the elements 147 and 148 of connector 146 clamped against each other, hence ensures the stability of the electric connection. The locking arrangement shown in FIGS. 10 and 11 is achieved in a particularly simple and rapid xvay, by manually urging the shaped element 159 that, by rotating about an axis substantially defined by the pair of pins 158, elastically deforms until the hooking between the bent hooking portions 161 and the pins 157 occurs. The unlocking is achieved in an equally simple and rapid way, without there being the need to use any tool, by operating on the end of the actuation lever 163 for elastically deforming the shaped element 159 and disengaging the bent, hooking portions 161 from pins 157.

A protection 164, achieved by over-molding, coats a part of the first element 147 and the end of cable 110 connected thereto, and is partially inserted in housing 149. An annular sealing gasket, or "O-ring", 165 is arranged between the protection 164 and the internal surface of housing 149.

The structure of connector 146 with the shaped locking element 159 and the arrangement of the annular gaskets 155 and 156 enable rapid and safe locking/unlocking operations and ensure the sealing between the elements 147 and 148. The latter feature is particularly important in consideration of the presence of coolants in the applications of head 1 in a machine tool for performing checkings in the course of the machining of pieces.

Obviously, the coupling of the shaped element 159 can be modified with respect to what has been herein illustrated and described, for example the slots 160 can be coupled to pins 157 fixed to the first element 148 of connector 146 and the bent hooking portions 161 can be adapted for cooperating with the pins 158. For this purpose, the shape of the pairs of pins 157 and 158 can vary with respect to what has been herein illustrated (with reference to FIGS. 7 and 10).

The assembly comprising the cable 110 and, joined at the ends of cable 110 by means of protections 117 and 164, the hollow support 100 with the windings 92 on the one side and the first element 147 of the connector 146 on the other side, in substance forms an integral element 166 for the electric connection (FIG. 7) easily insertable in (and removable from) an apparatus that comprises the head 1 and the processing unit 81.

In fact, the operations required for the insertion and the coupling—in the correct position—of the hollow support 100 to casing 3, as previously described, are particularly simple and rapid. Even the coupling and the locking of the two elements 147 and 148 of connector 146 by means of the elements shown in FIGS. 10 and 11 is easy and rapid, besides being safe and providing tightness. The possibility of a rapid insertion of the integral element 166, shown in FIG. 7, is an aspect that contributes to making the apparatus particularly flexible and allows, for example, to assemble in an interchangeable way elements that comprise windings 92 (and associated spools 95 and hollow supports 100) of different length for varying the measuring range of head 1.

Figure 12:
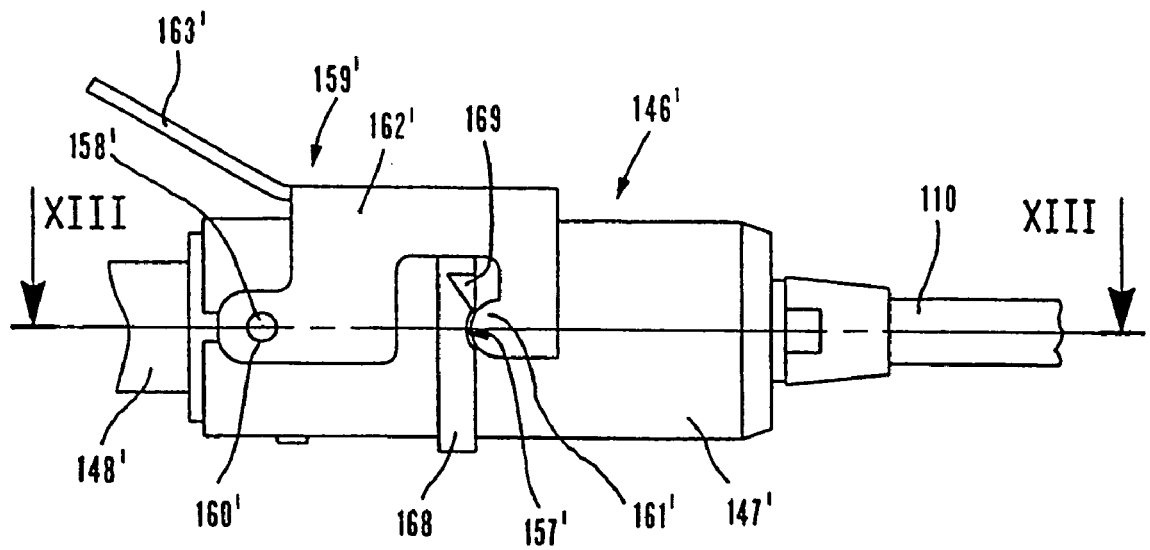
FIG. 12 is a partly cut-away side view of a component of a head, according to a different embodiment of the invention with respect to FIG. 10.
Figure 13:
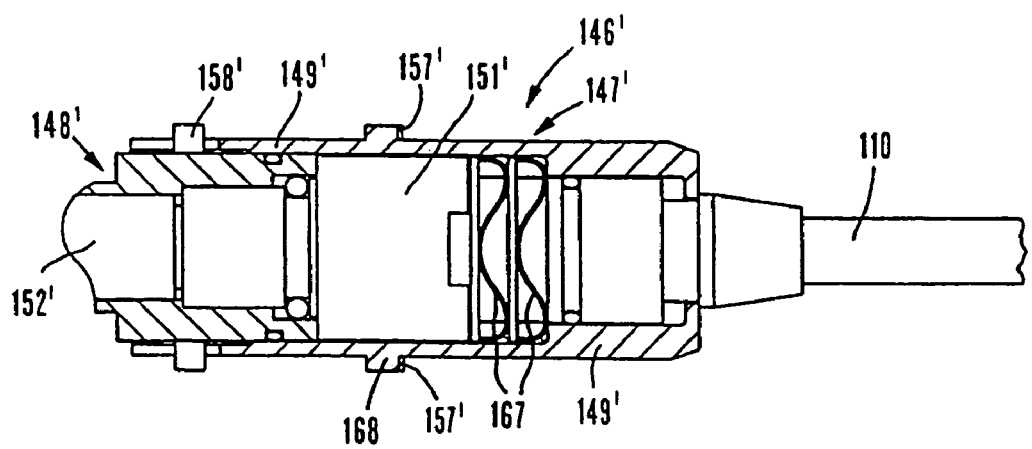
FIG. 13 is a partly cut-away cross-sectional view of the component shown in FIG. 12, along the line XIII—XIII of FIG. 12, with some details shown in view.

FIGS. 12 and 13 schematically show a connector 146' with a rapid locking/unlocking device including some slightly different constructional features with respect to the one of FIGS. 7, 10 and 11. In particular, a locking element 159' is made, for example, from cut and bent sheet (e.g. sheet-steel) and has end slots 160' pivotably coupled to pins 158', hooking portions 161' and a central connecting portion 162' defining an actuation lever 163'. A first element 147' of the connector 146' substantially differs from element 147 shown in FIG. 7 in that central cylinder-shaped element 151' (that is shown in view in FIG. 13) is coupled within housing 149' and elastic elements 167 (e.g. a couple of shaped laminar springs that are also shown in view in FIG. 13) are arranged between element 151' and the bottom end of housing 149' where cable 110 is connected. The elastic elements 167 have openings, not shown in the drawings, allowing to properly couple the electrical wires of cable 110 to element 151'. The housing 149' of element 147' has a substantially cylindrical external surface and an annular projection 168 with two opposed sloping recesses 169 and notches 157', the latter defining gripping surfaces adapted to cooperate with hooking portions 161' of locking element 159'. A second element 148' of connector 146' is substantially similar to element 148 of FIGS. 7 and 10, and includes the above cited pins 158'.

Locking and unlocking operations of the connectors 146 and 146' are substantially the same, and are equally rapid and safe. In particular, according to the embodiment of FIGS. 12 and 13, the elements 147' and 148' of the connector 146' are locked by urging them against each other and rotating the shaped element 159' about the axis defined by pins 158' until the hooking portions 161', after having engaged the sloping recesses 169, lock in the notches 157'. During this operation the elastic elements 167 are pre-stressed and—during and after the engagement between hooking portions 161' and notches 157'—apply an elastic pulling force between elements 151' and 152' that keeps the elements 147' and 148' clamped against each other.

In substance, the locking/unlocking device features an elastic clamping action that is applied, in connector 146 by the shaped element 159 of FIG. 10, and in connector 146' by the elastic elements 167 of FIG. 13. Of course, even though two springs 167 are shown in FIG. 13, one or a different number of elastic elements can apply the same kind of elastic action.

Obviously, where connector 146' is employed, element 147' can be part of an integral element corresponding to element 166 of FIG. 7. In such integral element, the cable 110 can be joined to element 147' by means of a protection obtained through an over-moulding process, or by a different known permanent connection.

The operation of head 1, for example for the checking of a piece 2 in the course of the machining in a numeric control machine tool, is as follows.

Before displacing the head 1 and the piece 2 to be checked towards each other in a known way, in order to prevent the feeler 27 from colliding against surfaces of piece 2, or other obstacles in the course of the approach, arm 20 is displaced to an inoperative position in which the feeler 27 is far from the operating position. For this purpose, the retraction device is activated by making air flow, from source 79, inside bellows 70, by passing through conduits 80 and the hole in cover 71. The pressure applied by the air causes the extension of bellows 70 until contact occurs between the annular limit-stop element 74 and the cylindrical projecting part 76 fixed to arm 20, at seat 75. The further extension of bellows 70 urges arm 20 to rotate thereby opposing the action of spring 60 and that of the magnets 121 until the head of screw 50 abuts against the upper surface of wing 22, thus defining the inoperative position of movable arm 20.

When arm 20 is in this position, the head 1 and the piece 2 to be checked are approached in order to bring the latter to the checking position. Before performing the actual checking operation, the retraction device is de-energized, progressively reducing air pressure at the source 79, and the bellows 70 returns to a retracted condition (shown in FIG. 2) that does not interfere with the measurement displacements of arm 20, hence urging the air in the bellows to flow out through conduits 80. The elastic recovery of the bellows 70 upon the stopping of the flow of compressed air is guaranteed by the shape and the material from which the bellows is made. In the event the bellows 70 be replaced with another bellows that, in spite of an identical shape and constitution, is unable to guarantee an identical elastic recovery to a shortened condition, there can be foreseen a return spring, arranged, for example, among the foldings of the bellows, externally or internally to it.

When the retraction device is de-energized and the piece 2 is in a checking position, the tractive force applied by spring 60 causes arm 20 to rotate in a clockwise direction (with reference to FIG. 2) and the feeler 27 is urged against the surface of piece 2.

Depending on the position that feeler 27 and consequently arm 20 undertake, core 91—supported by stem 93—takes a corresponding specific position with respect to the windings 92 of the transducer 90.

The electric signals provided by the transducer 90 are indicative of the mutual position of core 91 with respect to windings 92 and, consequently, of the position taken by feeler 27 with respect to a zero position previously set when performing the operations required for the zero setting against a master piece. These signals are sent by transducer 90, through the wires of cable 110, to the processing unit 81 that compares the measurement values with previously memorized nominal values of piece 2. The processing unit 81 can be connected, for example, to the numerical control of the machine tool for the machine feedback, in other terms for checking the machining on the basis of the dimensions of piece 2 measured by head 1.

Figure 14:
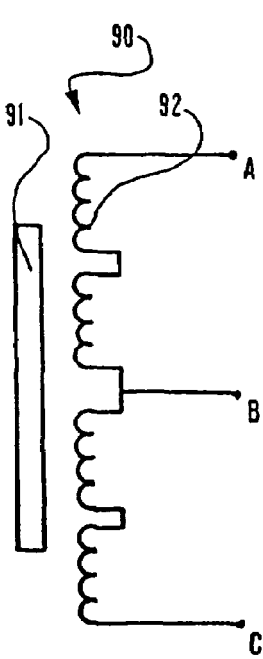
FIG. 14 schematically shows a circuit diagram, representing a transducer utilized in the head shown in FIG. 2.

The transducer 90, as already mentioned, is of the "HBT", "Half-Bridge Transducer" type, that is insensitive to variations in the length of cable 110. More specifically, transducer 90 is a half-bridge transducer based on multiple windings, also known as a "HBT multiwinding" transducer, according to a technique that foresees the appropriate splitting of the windings in two or more sections, the utilization of a core 91 of a suitable length, and the obtaining of a transducer linearity range that is particularly broad with respect to the overall dimensions of the transducer. FIG. 14 schematically shows a possible arrangement of the pair of windings 92, connected in series, each divided into two sections, and that of the core 91 of transducer 90. By means of the wires of cable 110, the windings 92 are fed by applying to each of the end terminals, A and C, an alternating voltage with respect to ground, the two voltages being identical to each other and in push-pull. The voltage with respect to ground at the intermediate terminal B has a consequendy theoretically null amplitude at a central position of the core and a variable amplitude as the position of core 91 varies. Amplitude variations are detected, by means of the wires of cable 110, by the processing unit 81.

It is also possible to feed the windings 92 with a single alternating voltage between the terminals A and C. In this case, the voltage with respect to ground at terminal B at the central position of core 91 has a known amplitude value other than zero (for example identical to half of that of the power supply voltage).

In the course of the machining of piece 2, movable arm 20, urged by spring 60, arranges itself in different angular positions (with reference to FIG. 2 it performs, for example, a limited rotational displacement in a clockwise direction). Consequently, the tension of the spring 60 varies as well as the force that this spring applies to arm 20 ("measuring force"), in particular with broad measuring range heads. The different amount of measuring force in the various checking phases can negatively affect the correct operation of head 1 owing to the different strains and deformations that this force causes on the surface of piece 2 to be checked and on the component parts of the head. In those applications of the head 1 that foresee the checking of pieces with grooved cylindrical surfaces, feeler 27 alternatively touches surface portions angularly separated from each other by falling, between a portion and the following one—owing to the absence of contact with the surface—of an amount that directly depends on the tractive force that arm 20 undergoes. When contact is made again with the subsequent cylindrical surface portion, feeler 27 collides against a surface that laterally limits this cylindrical portion.

Thus, if spring 60 applies forces of a different entity to arm 20, the feeler 27 falls by different amounts, and consequently collides at different points, and thereby causes possible different responses in the subsequent operation of the head 1.

Hence, for this reason, the total amount of force ("measuring force") applied to arm 20 is substantially kept constant thanks to the action of the magnets 121 at the corresponding areas facing arm 20. In fact, the forces applied by spring 60 and by magnets 121 vary in opposite direction as the angular position of arm 20 varies. More specifically, with reference to the arrangement shown in FIG. 2, the limited rotational displacements in a clockwise direction that arm 20 undergoes in the course of the machining of piece 2 cause an approach between the portion of arm 20 to which there is coupled an end of spring 60 and the internal surfaces of recess 12 of casing 3 to which the other end of spring 60 is coupled to and where the magnets 121 are arranged. Consequently, the tension of the return spring 60 progressively decreases, and with it the force applied by spring 60 to arm 20. At the same time, the distance between the permanent magnets 121 and the areas of arm 20 facing them decreases and the magnetic tractive force applied by magnets 121 to arm 20 increases. Owing to the fact that, as already mentioned, the forces applied by the return spring 60 and by the magnets 121 both urge feeler 27 against the surface of piece 2, it is possible to choose and arrange the magnets 121 in such a way so that the opposite sign intensity variations enable a substantial compensation of the entire measuring force applied to arm 20.

Figure 15:
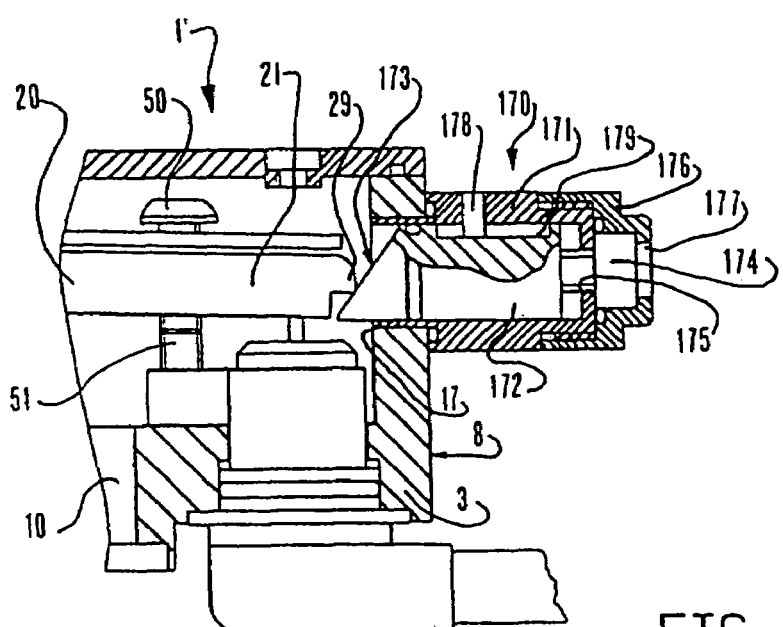
FIG. 15 is a longitudinal cross-sectional view of a detail of a head according to a different embodiment of the invention.

The head 1', partially shown in FIG. 15, is substantially identical to the one shown in FIGS. 1–6, apart from the retraction device. In fact, bellows 70 (shown in FIG. 2) is not arranged in seat 10, and an adjustment device 170, that defines an associated longitudinal adjustment axis, is coupled to the rear face 8 of casing 3 at a position corresponding to a through hole 17. The adjustment device 170 comprises a hollow cylinder 171, externally arranged with respect to the casing and an adjustable locating piston 172 (shown in FIG. 15 only partially cross-sectioned), housed in cylinder 171, that can perform translation displacements along the longitudinal axis of device 170. The piston 172 has a sloping abutment surface 173, at an end arranged inside casing 3, that cooperates with an end 29 of the end portion 21 of arm 20 (shown in view in FIG. 15). An actuation element comprises a screw 174 that traverses a through hole 175 of cylinder 171 and is coupled, by means of an adjustable threaded coupling, to the other end of the locating piston 172. A hollow cylindrical cover 176 with a centrally located access hole 177 is externally coupled to cylinder 171 and restrains the head of screw 174 thereby allowing it to perform only rotational displacements about its axis, with respect to cylinder 171. A guide device for preventing substantial axial rotations between the piston 172 and the cylinder 171 comprises a transversal pin 178 fixed to the internal surface of the hollow cylinder 171 and partially housed in a slot 179 defined on the external surface of the locating piston 172.

By using a suitable tool for traversing hole 177 and adjusting the head of the screw 174, thanks to the adjustable threaded coupling between screw 174 and piston 172 and the guide device with the pin 178 and the slot 179, it is possible to rotate screw 174, and thereby cause translation displacements of piston 172. In this way, the sloping surface 173 can be displaced to contact the end 29 of portion 21 of arm 20 and cause arm 20 to rotate (in a counter-clockwise direction with reference to FIG. 15), until reaching the inoperative position defined by the abutment between the upper surface of wing 22 and the head of screw 50. When the head 1' is under normal working conditions, piston 172—and consequently the sloping surface 173—is in a retracted position towards the exterior of casing 3, in order not to interfere with the displacements of arm 20. More specifically, the position of the sloping surface 173 can be set in such a way so as to define, thanks to the contact with the end 29 of arm 20 urged by the thrust of spring 60, the position of feeler 27 (not shown in FIG. 15 for the sake of simplicity) when the head 1' is in rest conditions, i.e. when no contact occurs between feeler 27 and piece 2. In this case, the action provided by the sloping surface 173 substitutes that of the limit-stop dowel 51 (shown in FIG. 15). There can also be foreseen the utilization of the adjustment device 170 just for adjusting the position of feeler 27 under rest conditions, as previously described, in a head that comprises a retraction device with bellows 70, like the one illustrated in FIG. 2.

The adjustment device 170 can also be coupled to the rear face 8 of casing 3 in a position substantially rotated by 180 degrees about its longitudinal axis with respect to the one shown in FIG. 15. In this case, the position of the sloping surface 173 is set for limiting, by contact occurring with the end 29 of the end portion 21, the rotations of arm 20 in a counter-clockwise direction (with reference to FIG. 15) and defining the inoperative position of arm 20 to which the arm 20 is brought by a retraction device comprising, for example, the bellows 70 shown in FIG. 2.

Figure 16:
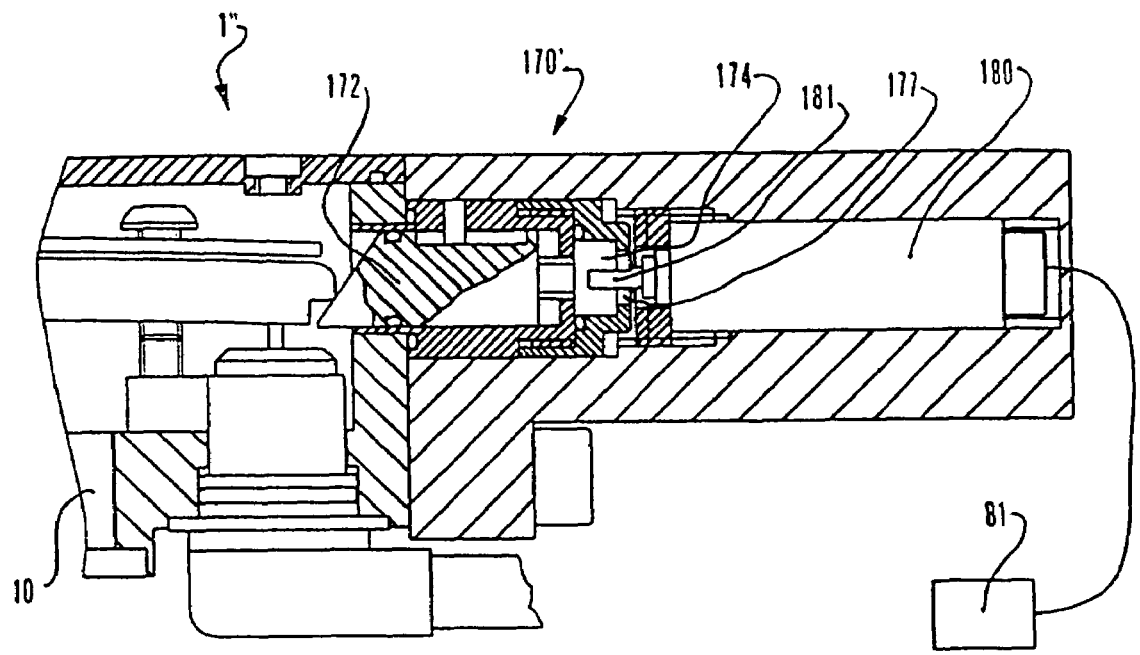
FIG. 16 is a longitudinal cross-sectional view of a detail of a head according to another embodiment of the invention.

The head 1" shown in FIG. 16 is similar to the one shown in FIG. 15, and comprises an adjustment device 170' with an electric motor 180 coupled to a piston 172 for adjusting its position. The components of the device 170' are substantially identical to those of the adjustment device 170 shown in FIG. 15, with the exception of the electric motor 180 that comprises a rotatable spindle 181, that has an end coupled—through the access hole 177—to the head of screw 174. The electric motor 180 is connected to the processing unit 81 from which it receives actuation signals for displacing arm 20 to the inoperative position, and/or for adjusting the position of the feeler 27 (not shown in FIG. 16 for the sake of simplicity) when the latter is under rest conditions, by displacing the sloping surface 173 as described with reference to FIG. 15. The possibility of automatically adjusting the position of feeler 27 under rest conditions, on the basis of the measuring signals that the processing unit 81 receives from head 1", is particularly advantageous when the head 1" performs the checkings of pieces with grooved surfaces. In fact, in the course of the checking of these pieces, as already described, the feeler 27 alternatively touches—even at very high frequencies—surface portions angularly separated from each other and falls—between one portion and the following one—of a certain entity (when there is no contact with the surface) and undergoes considerable impacts, along directions substantially tangential to the surface of the piece, when contact is resumed. In order to limit the negative effects of these impacts, it is convenient that the distance between the positions where the feeler 27 is in its rest position and in contact with the surface portions be relatively small. The head 1" shown in FIG. 16 enables the dynamic setting of the position of feeler 27 in a rest condition (i.e. when there is no contact with the piece), depending upon the measuring signals sent by head 1" to the processing unit 81, for limiting in a suitable way the formerly mentioned distance and minimizing the effects of the unavoidable impacts. It should be realized that, when checking pieces with grooved surfaces, the action that fin 55 (shown in FIG. 2) has on the oil that fills recess 12 of the head is of particular importance, in that it dampens the displacements of arm 20 in the course of the sudden passages from the surface portions to the inbetween areas and vice versa, and preventing the arm 20 from possible bouncings, that occur as a consequence of the previously mentioned impacts.

A different arrangement of the adjustment device 170' and other combinations with other retraction devices (for example, the bellows 70) and/or limiting device (screw 50, dowel 51) are possible in an entirely identical way to what has been hereinbefore described with reference to device 170, shown in FIG. 15.

Although the figures and the description refer to gauging heads 1, 1' and 1", measuring heads that comprise the described characteristics also fall within the scope of the invention.

Furthermore, gauging or measuring heads that incorporate just some of the herein described and illustrated characteristics, relating, for example, to the structure of the transducer 90 and/or the connector 146/146' are also within the scope of the invention.

The fulcrum utilized in the heads 1, 1' and 1" according to the invention, that consists in the deformable element 30, has a particularly simple, compact and inexpensive structure. Besides guaranteeing extremely accurate displacements of arm 20, fulcrum 30 enables extremely simple and rapid operations for the coupling to the reciprocally movable parts (arm 20 and casing 3).

The manufacturing aspects of the deformable element 30 can differ with respect to what has been described and illustrated in the figures. For example, the number of laminae can be reduced to two (for example, laminae 31 and 32, shown in FIG. 6). Moreover, one of the two laminae can have a different shape: in particular, there can be foreseen an embodiment wherein the two coplanar laminae 31 and 33 are replaced by a single lamina with a central opening for the passage of lamina 32. Even the arrangement of the laminae can differ, since the reciprocal angular position and the arrangement with respect to blocks 34 and 35 can vary. In specific applications, there can be foreseen, for example, a fulcrum comprising two reciprocally parallel laminae permanently coupled to blocks 34 and 35.

An advantageous feature that the above illustrated and described heads provide consists in the specific compactness, by virtue of the absence of intermediate supports and the coupling of the components (fulcrum, return spring, elements of the transducer and limiting devices) directly to casing 3. The possibility of reducing to a minimum the layout dimensions of the heads is particularly advantageous when the space available is limited, for example in the case of "in-process" applications, i.e. when the mechanical pieces are checked in the course of the machining in a machine tool.

Figure 18:
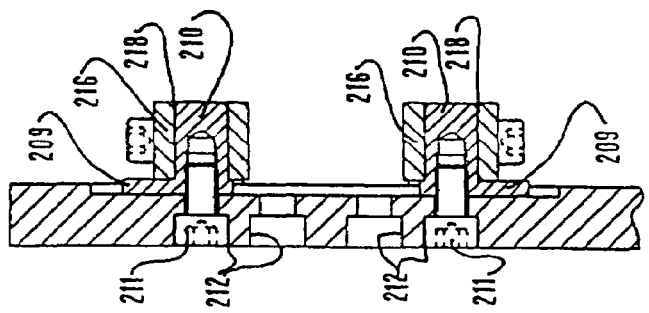
FIG. 18 is a partly cut-away cross-sectional view of the apparatus shown in FIG. 17, along the line XVIII—XVIII of FIG. 17.
Figure 17:
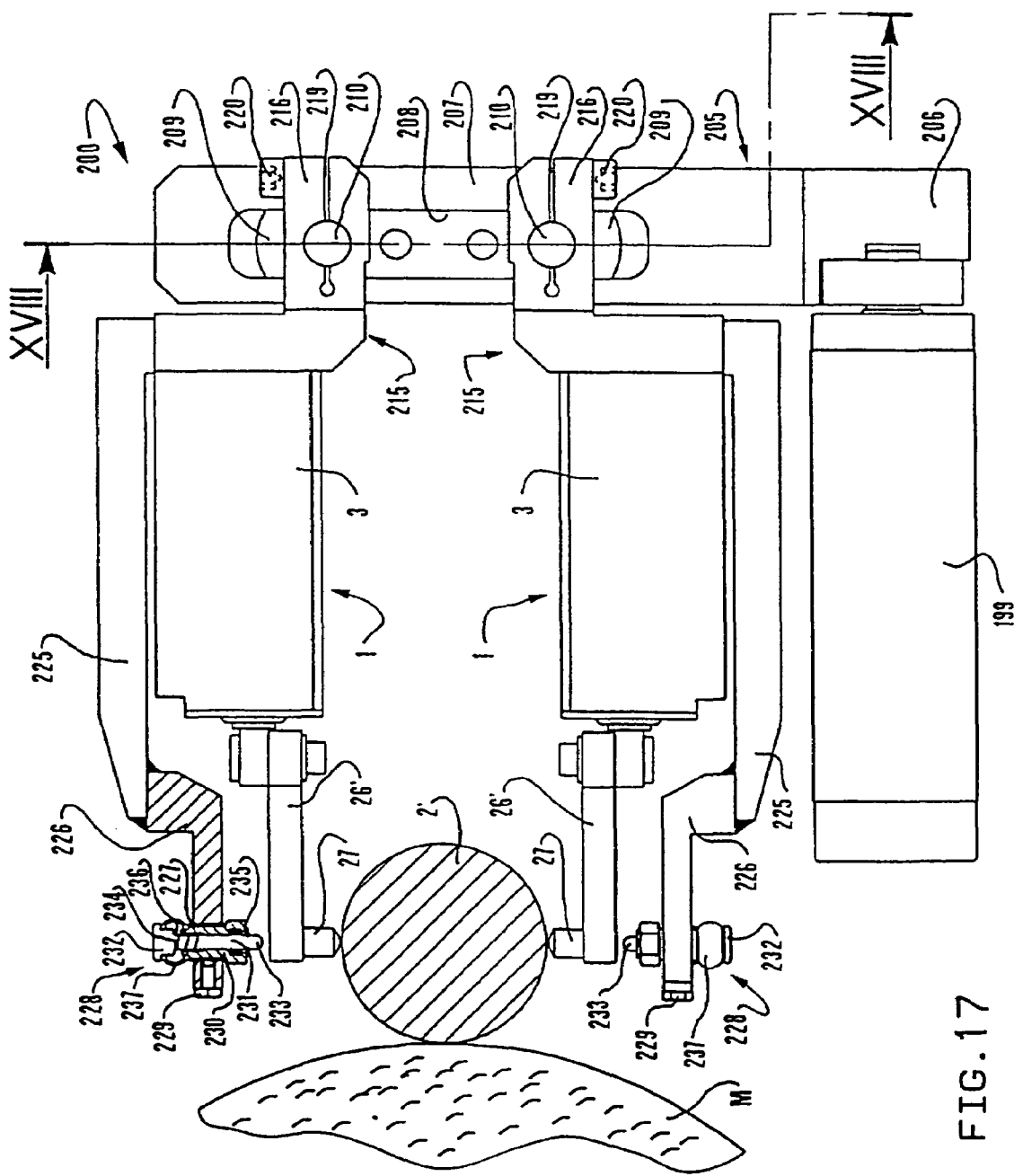
FIG. 17 is a longitudinal cross-sectional view of a first apparatus according to the invention, with some details shown in view and in the course of the checking of a piece.

The apparatus shown in FIGS. 17 and 18 comprises a first support and reference system 200 for two heads 1, substantially gauging heads similar to those hereinbefore described and illustrated, for example, with reference to FIGS. 1–5. The heads 1 are shown in view in FIG. 17, that substantially illustrates the casings 3, the feelers 27 and the associated supports identified by reference number 26'.

The system 200 comprises a stationary structure 205 including a base 206 coupled, as shown in FIG. 17, to a pneumatic slide of a known type identified by reference number 199, and a stanchion 207 rigidly coupled and perpendicular to base 206. A side of the stanchion 207 (the front side in FIG. 17) has an elongate seat 208 that houses two prismatic blocks 209 each carrying a cylindrical pin 210 perpendicularly arranged with respect to said side of stanchion 207. The specific dimensions of blocks 209 enable the latter to slide with a limited amount of clearance in seat 208 and the blocks 209 can be coupled in pre-set positions by means of screws 211 that traverse intermediate 207 by passing through holes 212 defined at the elongate seat 208. There can be foreseen a plurality of pairs of holes 212 for the coupling of the blocks 209 in a number of positions on stanchion 207.

Adjustable, coupling supports 215 are rigidly coupled, for example by means of screws not shown in the figures, to the rear face 8 of heads 1 and each has a first portion 216 for the adjustable coupling to one of the cylindrical pins 210 and a second elongate portion, or reference arm, 225, substantially arranged in a direction parallel to the longitudinal geometric axis of the associated head 1. The first portion 216 of each support 215 defines a hole 218 for housing the associated pin 210 with a specific amount of negative allowance, and a slit 219 that enables to elastically vary the amplitude of hole 218 and clamp, with an amount of force that is adjustable by operating a screw 220, the first portion 216 on pin 210, hence achieving the coupling between the support 215 and the stanchion 207 of the stationary structure 205. The clamping force defined by screw 220 provides a frictional coupling that enables to keep the associated head 1 in a pre-set angular position in the course of the checking operations, and vary this angular position, about an axis defined by pin 210, in the course of the zero setting operations, or in consequence of impacts that heads 1 undergo, as hereinafter described.

The reference arms 225 comprise shaped, free ends 226, substantially arranged parallel to arms 20 of the associated heads 1, with holes 227 that house adjustable reference mechanisms 228, and locking screws 229 for locking the position of the mechanisms 228 in the associated holes 227. The two reference mechanisms 228 are identical to each other and only one (shown cross-sectioned in FIG. 17) is hereinafter briefly described. The mechanism 228 comprises a tubular guide and reference element 230, inserted in the associated hole 227 and held in position by means of the locking screw 229, that houses and guides a movable element, more specifically a nail 231 with a head 232 and a substantially ball-shaped end 233 that defines an abutment portion facing arm 20 of head 1. Elastic thrust means comprise a compression spring 234 arranged between the tubular element 230 and the head 232 of nail 231, while annular abutment surfaces 235 and 236 are defined by nail 231 for cooperating with surfaces of the tubular element 230 and define a rest and a reference position, respectively, of nail 231. A tubular sealing gasket 237 is coupled between the head 232 of nail 231 and the tubular element 230 in a known way that is not shown in FIG. 17, for the sake of simplicity and clarity.

The apparatus shown in FIG. 17 can be utilized for the external diameter checking of a cylindrical piece 2' in the course of the machining in a grinding machine by a grinding wheel M. Before the checking operations begin, the apparatus shown in FIG. 17 is zero-set against a master piece in the following way. For each head 1, the position of the tubular element 230 in hole 227 is set in a suitable way by operating the locking screw 229. The choice of this position is an aspect that will become more apparent in the course of the following description.

The master piece is placed in the checking position and the angular arrangement of the heads 1 about the axes defined by pins 210 is such that the feelers 27 are at a specific distance from the surface of the master piece.

By manually urging the heads 232, the nails 231 are displaced to the reference positions defined by contact occurring between the surfaces 236 and the tubular element 230. By furtherly urging the heads 232 of nails 231 towards each other and applying a certain amount of force, there are caused rotations in opposite directions of the supports 215 and of the heads 1 coupled thereto, about the axes of pins 210. These rotations are enabled by the frictional coupling hereinbefore described.

As each of the feelers 27 contacts the surface of the master piece, the position of the associated arm 20 with respect to the master piece is set, and the rotation of the support 215 and the head 1 continues for a very short stroke until reaching contact between the end 233 of nail 231 and a stop surface of the movable arm-set of the head, in particular of the support 26' for the feeler 27. The arrangement of arm 20 with respect to casing 3, set in this way for each head 1, corresponds (thanks to the coupling of the tubular element 230 in the suitably chosen hole 227, as previously described) to a zero setting configuration of head 1, i.e. a configuration according to which the reciprocal position between core 91 and windings 92 of the transducer 90 is set in a known zero position.

After having defined in this way the operative position of heads 1, with respect to the stationary structure 205, more specifically, the angular arrangement about the axes defined by pins 210, the force manually applied to the heads 232 of nails 231 is removed. The latter are urged by the thrust of springs 234 to take retracted rest positions, defined by the abutment between the surfaces 235 and the tubular element 230, that are positions in which the supports 26' of feelers 27 do not touch the nails 231 in the course of the checking operations.

Moreover, the frictional coupling with the cylindrical pins 210 allows rotational displacements of heads 1 in the event there be applied a force of a certain entity to the associated coupling supports 215, for example, as a consequence of accidental impacts that the heads, the supports 26' for the feelers 27 and/or the coupling supports 215 could undergo, hence preventing any possible breakage of or damage to the various internal and external components of heads 1.

The apparatus shown in FIGS. 19 and 20 comprises a second support and reference system 500 for two heads 1, substantially similar to those shown in FIG. 17. In this case too, the heads 1 are shown in a view where the casings 3, feelers and associated supports, identified by reference number 27' and 26'', respectively, are substantially shown.

The system 500 comprises a stationary structure 505 including a base 506 coupled, as shown in FIG. 19, to a pneumatic slide of a known type identified—as in FIG. 17—by reference number 199, and a stanchion 507 perpendicular to base 506 and coupled thereto. A connecting block 501 is fixed to the stanchion 507 by means of screws 520 and has a transversal through hole 508 housing a bolt 511. Adjustable coupling supports 515 are rigidly coupled, for example by means of screws not shown in the figures, to the rear face 8 of heads 1 and each has a connecting portion 516 with a through hole 518 for the adjustable coupling to the connecting block 501. In particular, the connecting portions 516 are arranged on both sides of the connecting block 501 in such a way that holes 518 and 508 are lined up to house bolt 511. A frictioning layer, shown in FIG. 20 by means of a thick, black line 519, is arranged between the mutually facing surfaces of each portion 516 and block 501. Each layer 519 can be achieved by means of a simple surface treatment of one of the parts, for example connecting portion 516, including hot spraying on the surface a hardening substance such as a "WIDIA" compound. A washer 513 is engaged to the bolt 511 at a free end thereof, the latter being interlocked to a nut 510 that is connected to a wrench 512 to fasten and loosen the coupling between the supports 515 and the connecting block 501. In particular, the two connecting portions 516 are urged against the connecting block 501 by the head of bolt 511 on one side and by the washer 513 on the other side. A screw having a large flat head 514 is threadedly coupled to the free end of the bolt 511 to keep the wrench 512 engaged to the nut 510.

An adjustable reference mechanism 528 is coupled to each head 1 and includes a first reference device and a second adjusting device. The two reference mechanisms 528 are identical to each other and only one (shown more in detail in FIG. 20) is hereinafter briefly described. The first reference device includes a frame 523 fixed to the front face 5 of casing 3 by means of screws 524 and a substantially L-shaped striker 531 coupled to the frame 523 and rotatable about a pivoting axis substantially parallel to the longitudinal geometric axis of associated head 1. A torsion spring 534 is arranged between an arm of the striker element 531 and one of the screws 524 to urge the former in a retracted rest position against the abutment surface of a limit pin 535 fixed to the frame 523. The striker element 531 can be manually rotated around the pivoting axis from the above mentioned rest position to contact the abutment surface of one of the screws 524 in correspondence of a reference position. The second adjusting device is coupled to the end portion 25 of arm 20 and substantially includes a transversally adjustable threaded pin 530, just a free end of which is shown in FIGS. 19 and 20, defining a stop surface. Element 531 defines a reference end surface 533 adapted to touch the threaded pin 530 during the zero-setting operations of the apparatus.

The apparatus shown in FIG. 19 can be utilized, for example, for the external diameter in-process checking of a cylindrical piece 2', as explained for the apparatus of FIG. 17, and corresponding zero-setting operations against a master piece are carried out. For each head 1, the transversal position of the threaded pin 530 is manually adjusted in a suitable way, according to a choice that will become more apparent in the course of the following description.

The master piece is placed in the checking position and the angular arrangement of the heads 1 about the axis defined by hole 508 of the connecting block 501 is such that the feelers 27 are at a specific distance from the surface of the master piece. After having operated the wrench 512 to slightly loosen the frictional coupling between the supports 515 and the connecting block 501, a force is manually applied to the L-shaped elements 531 of both heads 1, and the elements 531 are first displaced to the reference positions. By applying a further amount of force to the same elements 531, there are caused rotations in opposite directions of the supports 515 and of the heads 1 coupled thereto, about the axis of hole 508. As each of the feelers 27 contacts the surface of the master piece, the position of the associated arm 20 with respect to the master piece is set, and the rotation of the associated support 515 and head 1 continues for a very short stroke until reaching contact between the reference end surface 533 of element 531 and the threaded pin 530 coupled to arm 20. The arrangement of arm 20 with respect to casing 3, set in this way for each head 1, corresponds (thanks to the coupling of the properly adjusted arrangement of the pin 530, as previously cited) to a zero setting configuration of head 1, i.e. a configuration according to which the reciprocal position between core 91 and windings 92 of the transducer 90 is set in a known zero position. After having defined in this way the operative position of both heads 1, mutually and with respect to the stationary structure 505, and more specifically, the angular arrangement about the axis defined by hole 508, the wrench 512 is operated to fasten the coupling and fix such angular arrangement, and the force manually applied to the L-shaped elements 531 is removed. As a consequence, the latter are urged against relevant limit pins 535 by the thrust of torsion springs 534, to take retracted rest positions.

The frictional coupling between the supports 515 and the connecting block 501—obtained by means of the layers 519—allows rotational displacements of heads 1 with respect to the stationary structure 505 in the event there be applied a force of a certain entity to the associated coupling supports 515, for example, as a consequence of accidental impacts that the heads 1, the supports 26' for the feelers 27 and/or the coupling supports 515 could undergo, hence preventing any possible breakage of or damage to the various internal and external components of heads 1.

Figure 21:
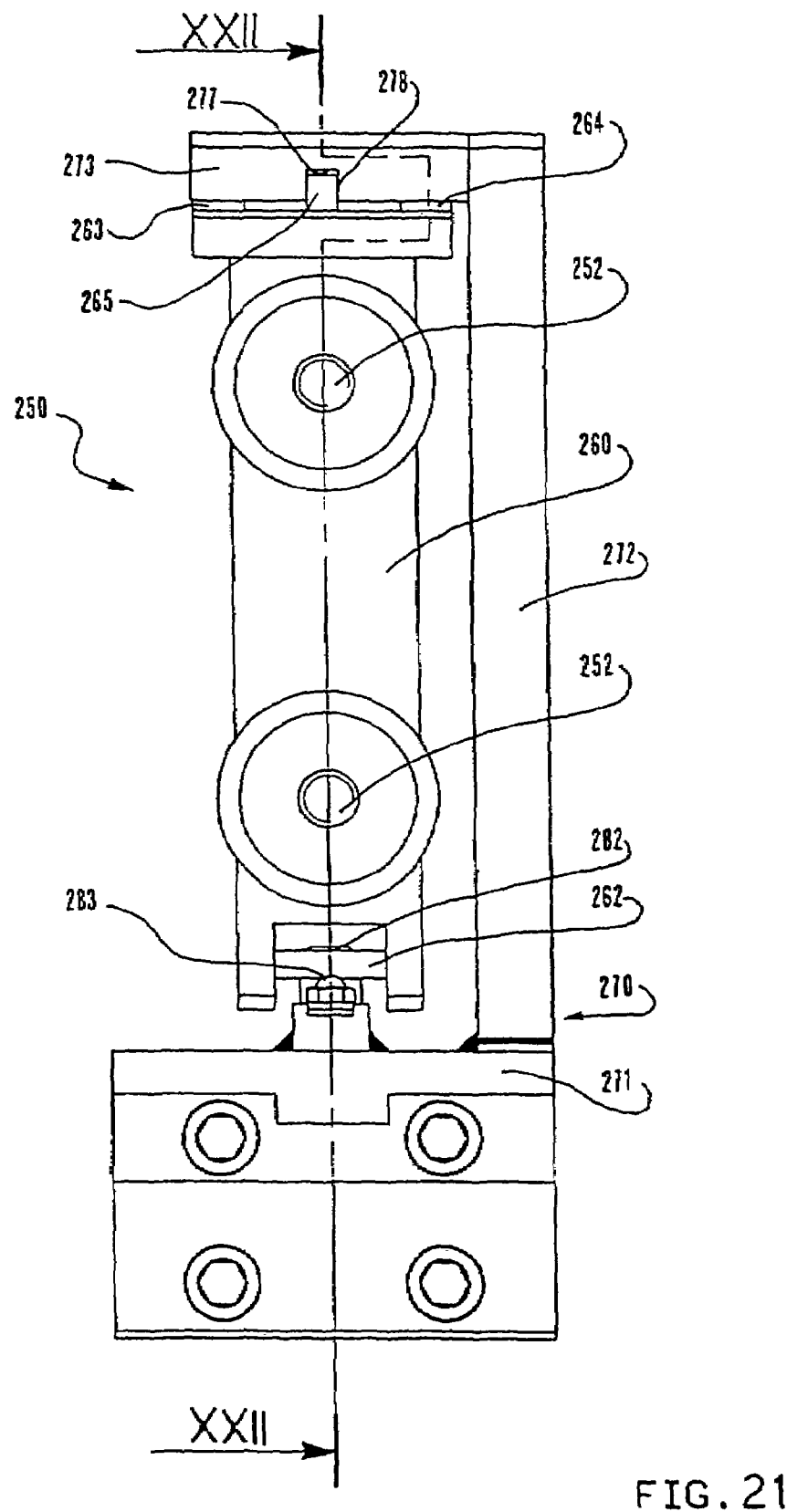
FIG. 21 is a rear view of a third apparatus according to the invention.
Figure 22:
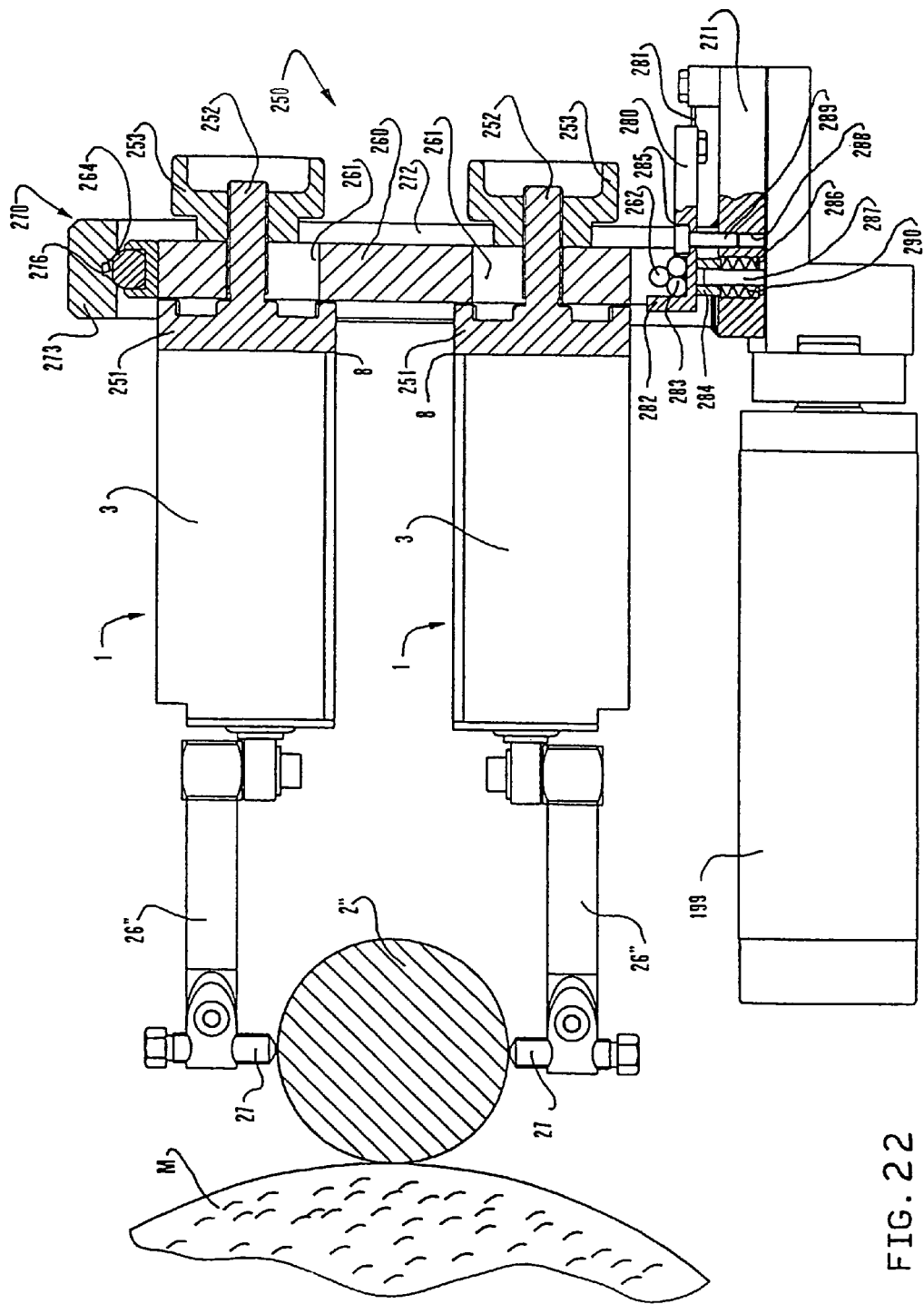
FIG. 22 is a longitudinal cross-sectional view, in a slightly reduced-scale, of the apparatus shown in FIG. 21, along the line XXII—XXII of FIG. 21, with some details shown in view and in the course of the checking of a piece.

The apparatus shown in FIGS. 21 and 22 comprises a third support and reference system 250 for two heads 1, substantially similar to those shown in FIGS. 17 and 19. In this case too, the heads 1 are shown in view and the casings 3, the feelers 27 and the associated supports, identified by reference number 26", are also substantially shown.

The system 250 comprises an elongate coupling support 260 to which there are coupled the heads 1 and a stationary structure, or frame, 270 to which the elongate support 260 is coupled in a removable way. Locking elements 251 are rigidly coupled, for example by means of screws not shown in the figures, to the rear face 8 of each head 1 and each has a threaded tang 252, substantially aligned along the longitudinal geometric axis of the associated head 1. The elongate support 260 defines a main layout direction and has two slots 261, aligned in this main layout direction, traversed by the threaded tangs 252. Two locking nuts 253, coupled to the ends of the threaded tangs 252, lock the heads 1 to the elongate support 260, hence permitting the adjustment of their positions in the associated slots 261 in the previously mentioned main layout direction. Moreover, the elongate support 260 comprises a first reference pin 262, arranged near a first end of support 260 (lower end) along a transversal direction, more specifically, perpendicular to the main layout direction. At the opposite end of support 260 (i.e. the upper end) there are coupled two additional cylindrical, reference pins 263 and 264, respectively, with plane upper portions, aligned in a direction parallel to that of the first pin 262, and a cylindrical insert 265 in an intermediate position between the two second reference pins 263 and 264.

In the arrangement shown in FIG. 22, frame 270 comprises a base 271 coupled to a pneumatic slide of a known type, identified—as in FIGS. 17 and 19—by reference number 199, a stanchion 272, rigidly coupled to base 271 and perpendicular to it, and a cross-piece 273, coupled to the free end of stanchion 272 that is substantially parallel to base 271. The cross-piece 273 comprises a bottom seat 276, substantially V-shaped, and a central prismatic opening 277 with an access slot 278 on a lateral wall of cross-piece 273 (the wall lying in the plane of FIG. 21).

A thrust device comprises a thrust lever 280, of a substantially prismatic shape, with an end coupled to base 271 by means of a lamina 281 and a relief rim 282 at the opposite, free end. Near rim 282, at a side of lever 280, there is a pair of balls that defines a reference seat 283 and at the opposite side there is an annular relief 284. The base 271 has a cylindrical seat 286, that houses a central reference pin 287, and a threaded hole 288 for the coupling of a limit screw 289, that traverses a through hole 285 of the thrust lever 280, and comprises an expanded head arranged in a suitable seat of lever 280. The annular relief 284 houses in the cylindrical seat 286 and is guided by the central reference pin 287, while contact between the surfaces of lever 280 and the head of screw 289 on the one side and the end of the pin 287 on the other side limit in a clockwise and in a counter-clockwise direction (with reference to FIG. 22), respectively, the rotational displacements of lever 280 about a transversal axis defined by lamina 281. Moreover, the thrust device comprises elastic elements with compression springs 290, for example of the so-called "cup" type, housed in the cylindrical seat 286 for urging the lever 280 to rotate in a counter-clockwise direction, away from the base 271.

In the example shown in FIG. 22, the heads 1 check the external diameter of a cylindrical piece 2" in the course of the machining in a grinding machine by a grinding wheel M, in an application entirely similar to the one schematically shown in FIGS. 17 and 19. The heads 1 are coupled to the elongate support 260 as hereinbefore described, in suitable mutual positions that take into account the initial and the final dimensions of the machined pieces to be checked and the measuring range of the heads 1. The elongate support 260 is in turn coupled—as hereinafter described—to frame 270, the position of which with respect to piece 2" can be checked in a known and herein not specified way. The upper end of support 260 is coupled to cross-piece 273 in such a way that the second reference pins 263 and 264 engage in the bottom seat 276 while the cylindrical insert 265 engages with limited clearance, through access slot 278, in the central prismatic opening 277. The lower end of elongate support 260 contacts the thrust lever 280, more specifically, the first reference pin 262 is arranged in the reference seat 283 defined by the pair of balls.

In this way, the position of the heads 1, coupled to the elongate support 260, is set and referred, in an extremely simple, rapid and accurate way, with respect to frame 270. Moreover, the specific arrangement and shape of the elements that achieve the coupling (pins 262, 263, 264 and insert 265 on the one side, seats 276 and 283, the opening 277 and the slot 278 on the other side) and the elastic thrust of the lever 280 enable the support 260 to release from the frame 270 in the event a force of a certain entity be applied to support 260, for example as a consequence of undesired impacts that the heads 1 could undergo in any direction, thereby preventing the possible breakage of or the damage to the component parts of the heads 1. In this case, the support 260 carrying the heads 1 can be re-coupled to frame 270 once the cause determining the release has been removed. It should be realized that, in the event the support 260 be released from frame 270, for example, owing to an undesired impact, the particular shapes, dimensions and reciprocal arrangements of the two parts (i.e. support 260 with the heads 1 on the one side and frame 270 on the other side) in substance prevent a total detachment and the consequent falling of the heads 1, and damages to them. In practice, the assembly including support 260 and heads 1 releases by yielding to undesired impacts and hence avoiding breakages, but it remains, in some manner, inserted between the base 271, the stanchion 272 and the cross-piece 273 of frame 270, preventing in this way possible dangerous falls and facilitating its retrieval. Some of the manufacturing details that contribute to preventing the assembly including support 260 and heads 1 from falling are the coupling arrangement between the cylindrical insert 265 and the central opening 277 with an access slot 278 and the presence of the relief rim 282. In fact, both these details prevent the support 260 from releasing at the side of the piece to be checked 2" that could cause not only the falling of support 260 (i.e. the passage of the part to which there are fixed the nuts 253 through the space defined by base 271 and cross-piece 273), but also a dangerous approach of the feelers 27 to the area of machining of piece 2", in particular to the grinding wheel M of the grinding machine.

Figure 24:
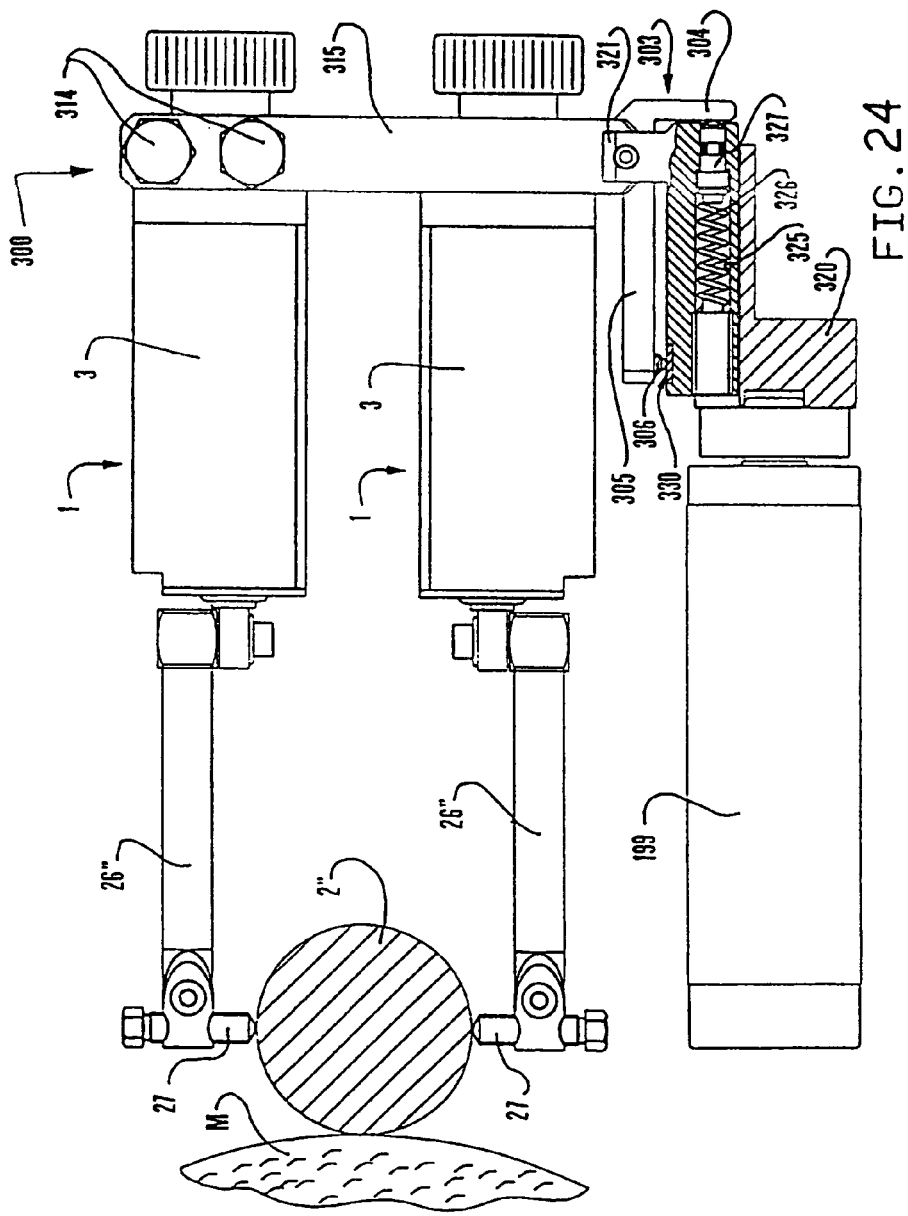
FIG. 24 is a side view of the apparatus shown in FIG. 23, along the direction indicated by the arrow XXIV in FIG. 23, with some details shown cross-sectioned and in the course of the checking of a piece.
Figure 23:
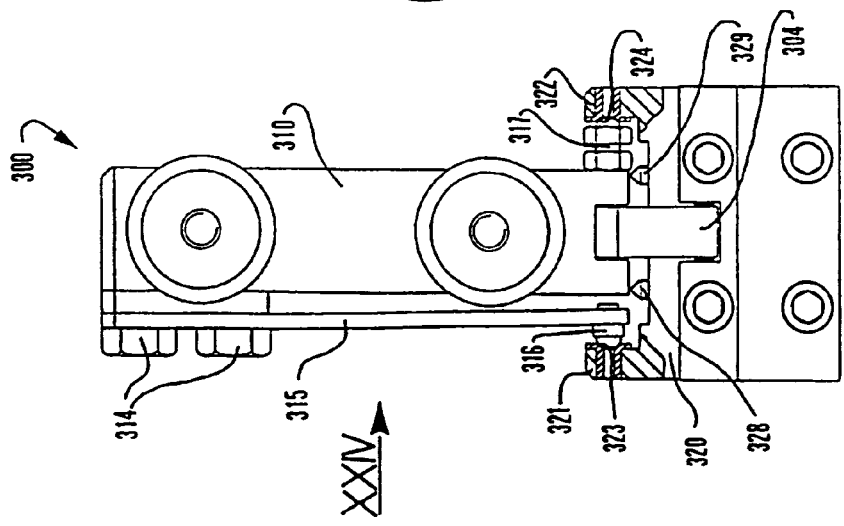
FIG. 23 is a rear view of a fourth apparatus according to the invention.

The apparatus illustrated in FIGS. 23 and 24 comprises a fourth support and reference system 300 for two heads 1, substantially similar to those of FIGS. 17, 19 and 22. In this case too, the heads 1 are shown in view and the figure substantially shows the casings 3, the feelers 27 and the associated supports that, as those of FIG. 22, are identified by reference number 26".

The fourth support and reference system 300 is under certain aspects similar to the third system 250 shown in FIGS. 21 and 22, and comprises an elongate coupling support 310 to which there are coupled the heads 1 and a stationary structure, or base, 320 to which there is coupled, in a releasable way, the elongate support 310.

According to the arrangement shown in FIG. 24, base 320 is coupled to a pneumatic slide of a known type, identified by reference number 199, as the one of FIGS. 17, 19 and 22. The heads 1 are coupled to the elongate support 310 in the adjustable way already described with reference to the coupling between the heads 1 and the elongate support 260 of FIG. 22.

The elongate support 310 comprises a thrust device with an elongate, elastic element 315 coupled, by means of screws 314, at an (upper) end of support 310 in such a way so that the elastic element 315 and the support 310 are substantially parallel along a main layout direction.

A free end of the elongate elastic element 315 has a reference element with a transversal pin 316 that has a ball-shaped end. The elongate support 310 has—at an opposite (lower) end—another reference element with an adjustable threaded pivot 317 that also has a ball-shaped end. Pin 316 and pivot 317 are substantially aligned along a coupling direction. A support lever 303, substantially L-shaped, is coupled to the lower end of the elongate coupling support 310 (for example, by means of a screw not shown in the figures) and comprises a short end 304, that extends below the lower end of support 310 and is substantially parallel to its main layout direction, and a long end 305 arranged substantially perpendicular to both the main layout direction and the transversal coupling direction, that carries at a free end an additional reference element, more specifically, a support pin 306.

The base 320 comprises two parallel, vertical wings 321 and 322 that define opposite conical seats 323 and 324 aligned in a transversal coupling direction. Moreover, the base 320 has a cylindrical hole 325 that houses an additional thrust device, that comprises a compression spring 326 and a cylinder-shaped element 327 that can slide in hole 325 and is urged by spring 326 towards the exterior of base 320. Two reference pins 328 and 329 are coupled to base 320 and have substantially conical ends facing the lower end of support 310.

According to the arrangement shown in FIG. 24, the heads 1 check the external diameter of a cylindrical piece 2" in the course of the machining in a grinding machine with a grinding wheel M, in an application that is entirely similar to the one schematically illustrated in FIGS. 17, 19 and 22. The heads 1 are coupled to elongate support 310 in suitable reciprocal positions that take into account the initial and the final dimensions of the machined pieces to be checked and the measuring range of the heads 1. The elongate support 310 is in turn coupled—in the manner hereinafter described—to the base 320, the position of which, with respect to piece 2" can be defined in a known and herein not described way.

The elongate support 310 is coupled to base 320 at the lower end only. More specifically, support 310 is moved towards base 320 and, with the aid of pins 328 and 329 that achieve a rough, reference limit-stop for the lower end of support 310, the ball-shaped ends of the transversal pin 316 and that of the threaded pivot 317 are inserted in the oppositely arranged conical seats 323 and 324. The position of pivot 317 along the transversal coupling direction is set by operating the threaded coupling between pivot 317 and support 310, so as to set in a suitable way the thrust applied by the elastic element 315. Any rotations of the support 310, and consequently of the heads 1, about the transversal axis of coupling are prevented by the cooperation between the support lever 303 and the base 320. More specifically, the support pin 306 is abutted against a plane reference surface 330 of base 320 thanks to the action of the cylinder-shaped element 327, that is urged by spring 326, against the short end 304 of lever 303. Obviously, the thrust that the spring 326 applies is sufficient for keeping—when the apparatus is under normal working conditions—pin 306 abutted against the surface 330 of base 320, as in the arrangement of FIG. 24.

In this case too, the position of the heads 1, coupled to the elongate support 310, is fixed and determined in an extremely simple, rapid and accurate way with respect to base 320. Moreover, the specific arrangement and shape of the elements that achieve the coupling (the ball-shaped ends of pin 316 and pivot 317 in the conical seats 323 and 324, the abutment of pin 306 on a plane surface) and the elastic thrust of the elongate element 315 and of the device that comprises the spring 326 and the element 327 enable support 310 to release from the base 320 in the event a force of a certain entity be applied to support 310, for example, as a consequence of undesired impacts that the heads 1 undergo substantially in any direction. In this way there is prevented the possible breakage of or the damage to the component parts of the heads 1. In a similar manner as in the arrangement shown in FIG. 1, the support 310 carrying the heads 1 can be re-coupled to base 320 once the cause for the release has been removed. Between the support 310 and the base 320 there can be foreseen an additional coupling—not shown in the drawings—for example by means of cables, for preventing the two components from completely detaching, owing to a possible release, with consequent falls and damage to the heads 1, and facilitate and speed up the operations for the re-hooking of support 310 to base 320. As an alternative, there can be limiting and protection surfaces, not shown in the figures either, for example fixed to the stationary structure and intended for limiting the displacement of the support lever 303 and preventing its moving away from base 320.

Moreover, the elongate elastic element 315 can be coupled to support 310 so as to undertake a different arrangement, not necessarily parallel to the support 310, that also guarantees the aligning between pin 316 and pivot 317 along a coupling direction.

Figure 26:
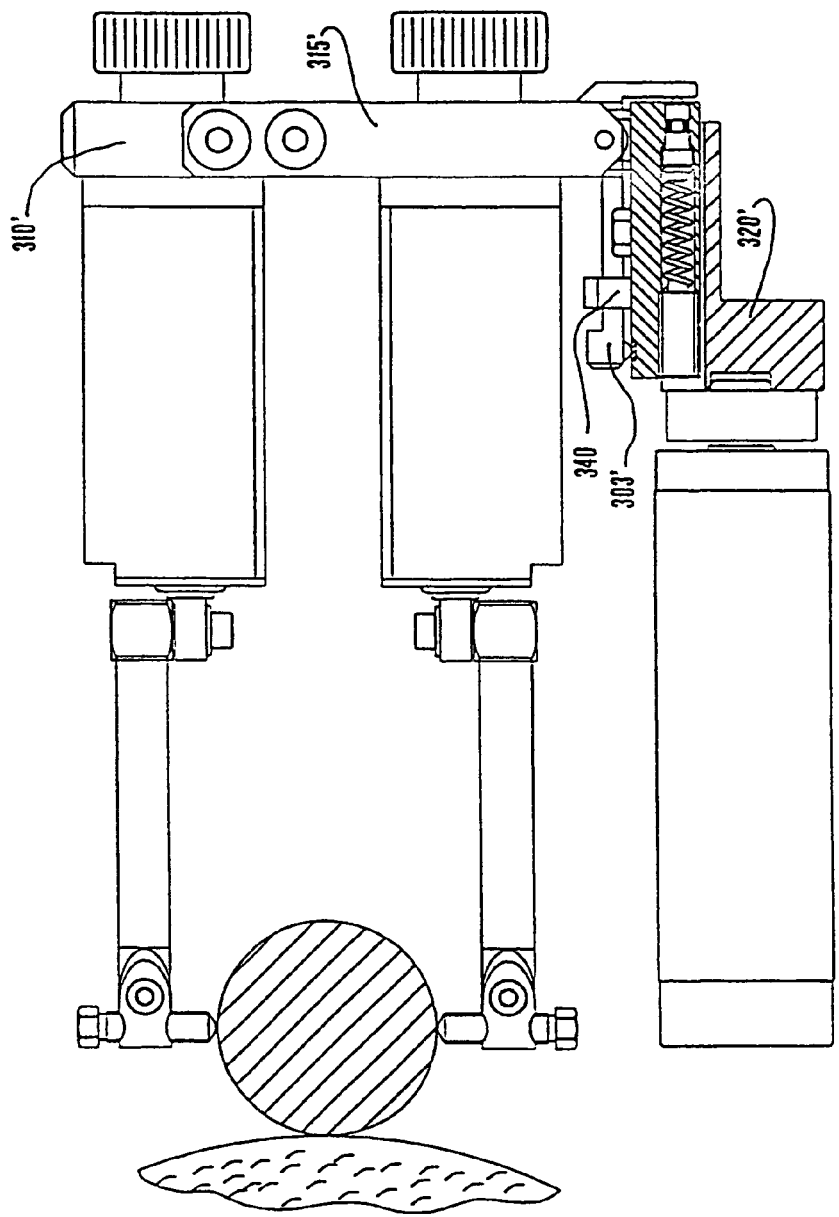
FIG. 26 is a side view of the apparatus shown in FIG. 25, when viewed in the direction of the arrow XXVI in FIG. 25; with some details shown cross-sectioned and in the course of the checking of a piece.
Figure 25:
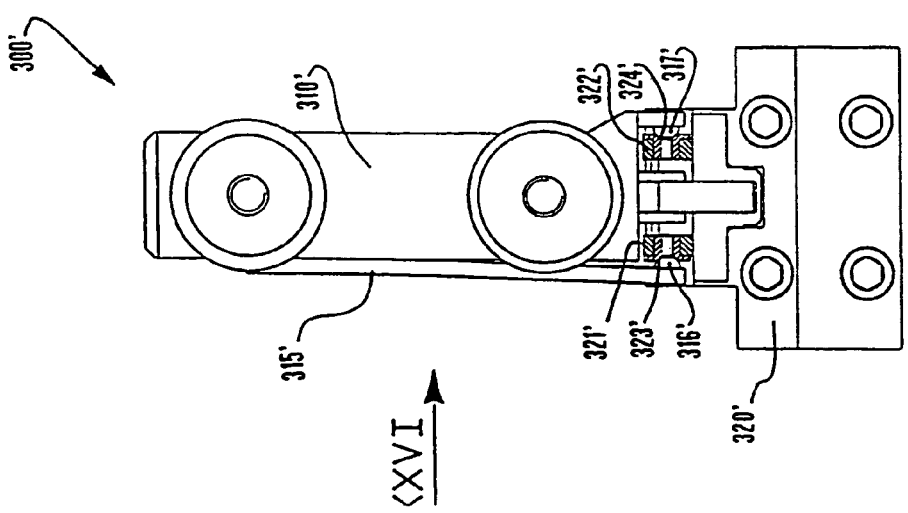
FIG. 25 is a rear view of an apparatus according to the invention, showing some modifications with respect to the fourth apparatus of FIG. 23.

Other modifications with respect to what is illustrated in FIGS. 23 and 24 are possible within the scope of the invention, for example, insofar as the arrangement of the pin 316, the pivot 317 and the conical seats 323 and 324 are concerned. The FIGS. 25 and 26 show a support and reference system 300' that is substantially similar—insofar as the structure and the operation are concerned—to the system 300 shown in FIGS. 23 and 24. Only the main manufacturing differences are herein briefly described. Two conical seats 323' and 324' are achieved in wings 321' and 322' of base 320', aligned in a transversal direction. A thrust device with an elongate elastic element 315' is coupled, by means of screws, to the elongate coupling support 310' and has, at a free end, a reference element 316' with spherical surface. Another reference element 317', with a spherical surface too, is coupled to the elongate element 310', facing element 316' and aligned with it in a coupling direction. Limiting and protection surfaces fixed to the stationary structure for limiting the displacements of the support lever 303' and those of the elongate element 310' fixed to it are schematically shown and identified by reference number 340 in FIG. 26.

The apparatus illustrated in figures from 27 to 30 comprises a fifth support and reference system 350 for two heads 1, substantially similar to those shown in FIGS. 17, 19, 22, 24 and 26. In this case too, the heads 1 are shown in view and there are substantially shown the casings 3, the feelers 27 and the associated supports that, as those of FIGS. 22 and 24, are identified by reference number 26".

The fifth support and reference system 350 is under certain aspects similar to the fourth system 300 shown in FIGS. 23 and 24, and comprises a coupling support 355 to which there are coupled the heads 1 and a stationary structure, or frame, 370 to which there is coupled, in a releasable way, the coupling support 355. As coupling supports 310, 310' in the arrangement of FIGS. 24 and 26, the coupling support 355 too is coupled to frame 370 at a lower end area of this support 355, and the latter carries the heads 1 with similar adjustable couplings.

The coupling support 355 comprises a vertical, elongate portion 360 that carries the heads and a plate 361 arranged in a substantially horizontal plane, with reference elements comprising two balls 362 and 363 fixed to a side base of plate 361, and a pair of pins 364 and 365 with ball-shaped ends, coupled to plate 361 at the opposite side base, and arranged along directions perpendicular to plate 361. A rotary pin 366 houses in a through hole 369 of plate 361 (FIG. 30) and has a first end facing an opening 367 of the plate 361, whereas the second end is coupled to an actuation lever 368.

The frame 370 is coupled, in the arrangement shown in FIG. 25, to a pneumatic slide of a known type identified by reference number 199 as in the FIGS. 17, 19, 22, 24 and 26 and comprises a base 371, a wall 372 rigidly coupled to a side of the base and perpendicular to it, and two columns 373 and 374, rigidly coupled at the opposite side of the base 371 and substantially perpendicular to it. The wall 372 has a central opening 375 near the base 371, and a transversal pin 376 is coupled to the frame 370 at this opening 375. The column 373 has a substantially angular shape with an end portion 377 arranged in a direction parallel to the base 371, and carries, fixed to the end portion 377, a pin 378 that defines an anchorage surface, parallel to the transversal pin 376. A conical seat 380 and a V-shaped seat 381 are defined in the internal surface of wall 372, near the side of the latter opposite to base 371, aligned along a transversal direction that is parallel to pin 376.

A thrust and locking device comprises an elastic element with a return spring 390, and a locking element with a hook 391. The ends of the spring 390 are hooked to the transversal pin 376, fixed to base 371, and to a through hole 392 in an end portion of hook 391, respectively. The rotary pin 366, coupled to plate 361, is rigidly fixed to hook 391, in a central hole 393 of the latter, at the opening 367 of plate 361, so that the rotations of the pin 366 cause corresponding rotations of hook 391 about a transversal axis defined by pin 366. The hook 391 also comprises an anchorage end portion 395 for cooperating with the anchorage surface of pin 378 for achieving the locking between the coupling support 355 carrying the heads 1 and the frame 370, as hereinafter described.

In the arrangement shown in FIG. 25, the heads 1 check the external diameter of a cylindrical piece 2" during the machining in a grinding machine with a grinding wheel M, in an application that is entirely similar to the one schematically shown in FIGS. 17, 19, 22, 24 and 26. The heads 1 are coupled to the elongate portion 360 of support 355 in appropriate reciprocal positions that take into account the initial and the final dimensions of the machined pieces to be checked and the measuring range of the heads 1.

The coupling and the locking between the support 355 and the frame 370 for defining a checking position of the heads 1 occurs in the following way.

The ball-shaped ends of pins 364 and 365, fixed to plate 361, rest on reciprocally coplanar rest surfaces defined by columns 373 and 374 and the balls 362 and 363 are inserted in the associated conical seat 380 and "V" shaped seat 381 of wall 372, respectively, hence achieving the coupling shown in FIG. 29. One of the two pins 364 and 365 can be coupled to plate 361 in a way (that is not illustrated in the figures) adjustable along its axis, or can be left out, for achieving a substantially isostatic coupling between the coupling support 355 and the frame 370.

Then the lever 368 is manually actuated for rotating the hook 391 (in a counter-clockwise direction with reference to FIG. 29) until there is achieved the cooperation between the end portion 395 and pin 378, shown in FIGS. 27, 28 and 30.

In the course of the rotational displacement of the hook 391, the tension force of the spring 390 increases until there is reached a maximum value that corresponds to the angular position in which the rotary pin 366 is centered on the straight line of action of spring 390 (i.e. the axis of the through hole 392 where an end of the spring 390 is hooked to lies in a plane defined by the axes of pins 366 and 376), thereafter decreasing until contact between the anchorage portion 395 and pin 378 occurs; in this position the rotary pin 366 is off-set only by a small amount, below the formerly mentioned straight line of action. Thus, the configuration shown in FIG. 28 achieves the locking of plate 361 to frame 370 in the arrangement defined by the reference elements and the associated seats and support surfaces. In fact, in this configuration, the tractive force of the spring 390 tends to maintain the cooperation between the anchorage portion 395 and pin 378, besides urging the balls 362 and 363 in the associated seats 380, 381 and the ball-shaped ends of pins 364 and 365 against the associated support surfaces of columns 373 and 374. In order to disengage the coupling shown in FIG. 28, it is necessary to rotate the hook 391 (in a clockwise direction with reference to FIG. 28), against the tractive force of spring 390, until going beyond the previously described configuration corresponding to a maximum tension force of spring 390. Once beyond this configuration, the tractive force of spring 390 contributes to the rotation (in a clockwise direction with reference to FIG. 28) enabling the unlocking of the parts (FIG. 29). This characteristic of the thrust and locking device is particularly advantageous for contributing to the disengagement of support 355 from frame 370 in the event that a force of a certain entity be applied to support 355, for example, further to the heads 1 undergoing undesired impacts, thereby avoiding the possible breakage of or the damage to parts of the heads 1.

In fact, the applying of these forces to support 355 causes the detaching, against the force of spring 390, between at least one of the couplings between the balls 362 and 363 and the seats 380 and 381. Subsequent displacements of plate 361 with respect to frame 370 (towards the left, with reference to FIG. 28) modify the balance configuration of FIG. 28, in particular tend to modify the angular arrangement of the spring 390 with respect to the rotary pin 366. As previously described, displacements of a small entity are sufficient for bringing the straight line of action of the spring 390 below the axis of the rotary pin 366 and cause the force of the actual spring 390 to help the detaching of the anchorage portion 395 from pin 378, and the subsequent disengaging of the support 355 from frame 370. In any case, the support 355 remains physically connected to frame 370 thanks to the connection including the spring 390 and the hook 391, in this way avoiding any possible falls of and damage to the heads 1. Thereafter, the coupling in the checking position can be re-set in a simple and rapid way by following the previously described procedure.

Figure 31:
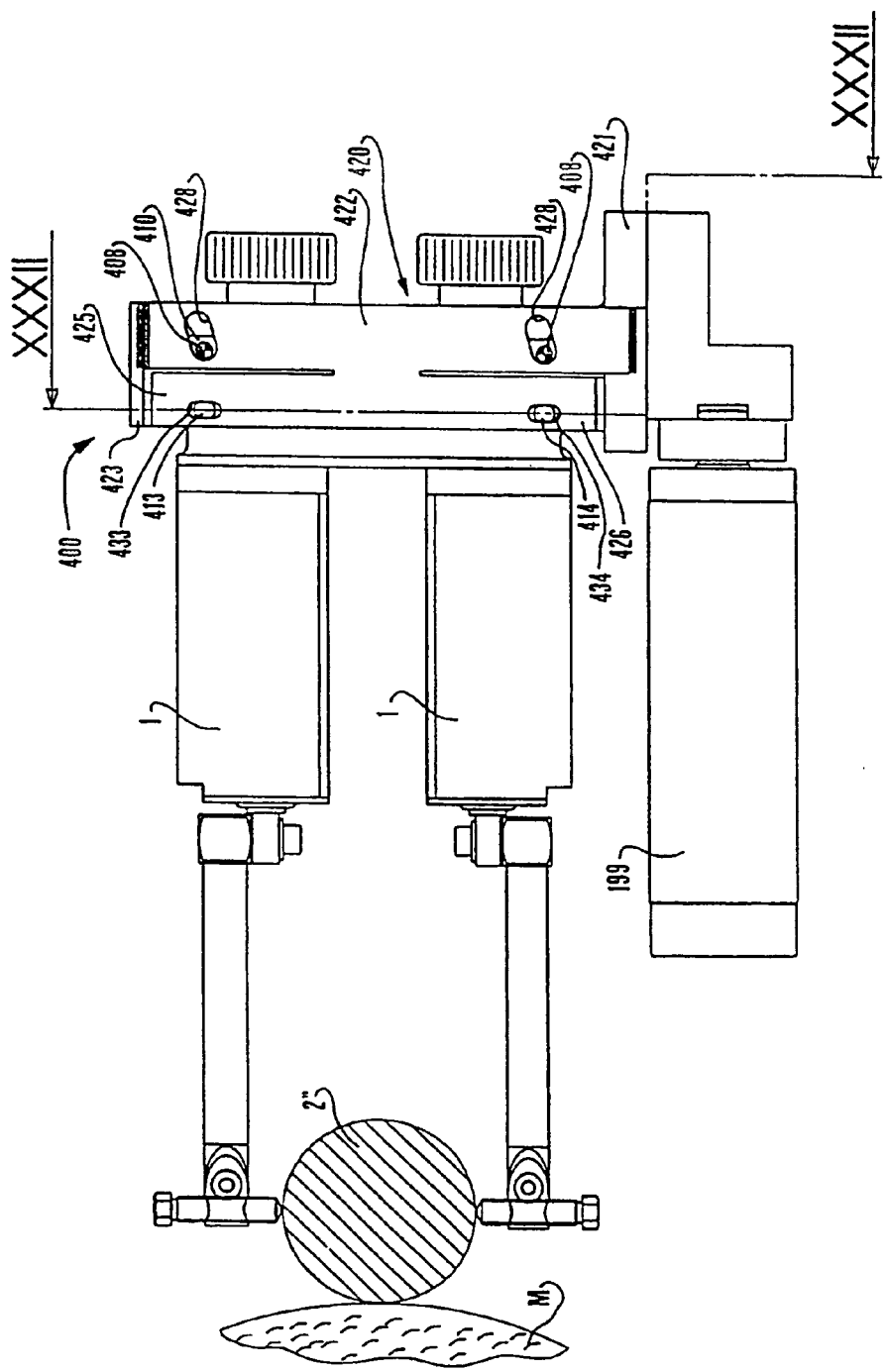
FIG. 31 is a side view of a sixth apparatus according to the invention, shown in the course of the checking of a piece.
Figure 32:
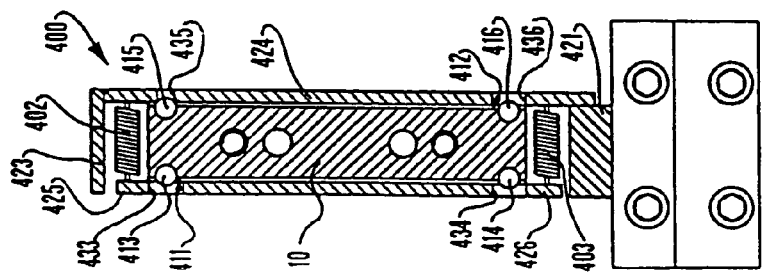
FIG. 32 is a cross-sectional view of the apparatus of FIG. 31, taken along the line XXXII—XXXII of FIG. 31.

The apparatus illustrated in FIGS. 31 and 32 comprises a sixth support and reference system 400 for two heads 1, that under some aspects is similar to the systems 250, 300, 300' and 350 of figures from 21 to 30 and comprises an elongate coupling support 410 to which there are coupled the heads 1 and a stationary structure, or frame, 420 to which there is coupled, in a releasable way, the elongate support 410. The heads 1 are coupled to the elongate support 410 in the adjustable way that has been previously described with reference to the coupling between the heads 1 and the elongate support 260 of FIG. 22.

The frame 420 comprises a base portion 421, secured, for example, to a pneumatic slide 199, and a bridge-type structure, fixed to it, with two stanchion walls 422, 424 and a cross-piece 423. One of the two walls 422 features slits that define thrust means with two portions 425 and 426 elastically movable with respect to the rest of the frame 420.

The elongate support 410 defines lateral surfaces 411 and 412 intended to be arranged facing the walls 422 and 424 and comprises reference elements with four balls 413, 414, 415 and 416 arranged by pairs on surfaces 411 and 412, aligned two by two (413/415 and 414/416) along transversal coupling directions near the ends of the elongate support 410.

The bridge-type structure of frame 420 defines four seats for the reference elements, more particularly two slots 433 and 434 in the elastically movable portions 425 and 426 of wall 411, and a circular hole 435 and a slot 436 in the wall 412. Two pairs of oblique slots are obtained in the walls 411 and 412 (just the pair of slots 428 in the stationary part of wall 411 is shown in FIG. 27).

Two return springs 402 and 403 are arranged along transversal directions between the wall 412 and the elastically movable portions 425 and 426, respectively.

In the arrangement shown in FIG. 31, as in the previously described arrangements, the heads 1 check the external diameter of a cylindrical piece 2" in the course of the machining in a grinding machine with a grinding wheel M. The heads 1 are coupled to the elongate support 410 in suitable reciprocal positions that keep into account the initial and the final dimensions of the machined pieces to be checked and the measuring range of the heads 1. The elongate support 410 is in turn coupled—as explained below—to frame 420, the position of which—with respect to piece 2"—can be defined in a known and herein not described way.

The support 410 is inserted at the interior of the bridge-type structure of frame 420 and arranged in such a way that the balls 413, 414, 415 and 416 house in the associated seats 433, 434, 435 and 436 and define a checking position of heads 1. At this position, two pairs of limit pins (only one of these pairs, 408, is shown in FIG. 31) are inserted in the oblique slots 428 and fixed to the surfaces 411 and 412 of support 410 (for example screwed into suitable threaded holes, not shown in the figures).

As in the case of the previously described support and reference systems, the position of the heads 1, coupled to the elongate support 410, is set and determined in an extremely simple, rapid and accurate way with respect to frame 420. Moreover, the specific arrangement and the shape of the elements that achieve the coupling (balls 413–416 and seats 433–436) and the elastic thrust applied by the movable portions 425 and 426 and by the springs 402 and 403 enable the support 410 to release from the frame 420 in the event a force of a certain entity be applied to the support 410, for example as a consequence of undesired impacts that the heads 1 could undergo substantially in any direction; in this way there is prevented the possible breakage of or the damage to parts of the heads 1.

Moreover, the presence of the pins 408 in the oblique slots 428 limits the mutual displacements between the frame 420 and the elongate support 410, enabling the previously mentioned release but preventing the complete detaching of the frame 420 and the fall of the elongate support 410 with the heads 1. This enables on the one side to avoid damage to the heads 1 and on the other to facilitate and speed up the operations for the coupling between support 410 and frame 420 for bringing the heads 1 back to the determined checking position.

Figures 33, 34:
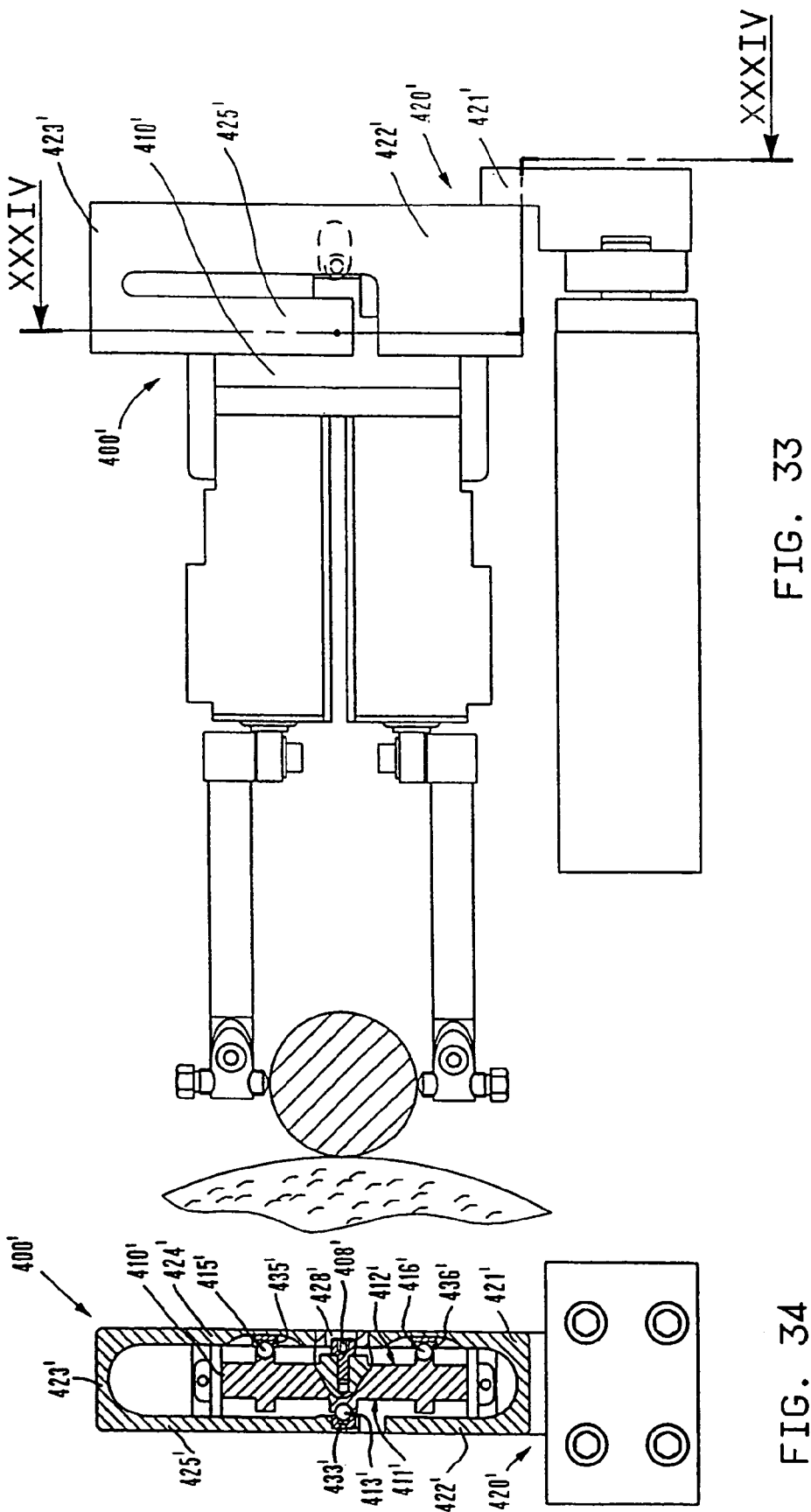
FIG. 33 is a side view of an apparatus according to the invention, showing some modifications with respect to the sixth apparatus of FIG. 31.
FIG. 34 is a cross-sectional view of the apparatus of FIG. 33, taken, apart from some details, along the line XXXIV—XXXIV of FIG. 33.

The sixth support and reference system can differ with respect to what is illustrated in FIGS. 31 and 32, for example insofar as the springs 402 and 403 are concerned. More specifically, depending on the dimensions and the shape of the components of the system 400, these springs 402 and 403 can be left out in the event the thrust applied by the portions 425 and 426 is sufficient for keeping the correct coupling between the balls 413–416 and the associated seats 433–436, in other terms for keeping the heads 1 in the determined checking position in the course of the normal functioning of the apparatus. The FIGS. 33 and 34 show a support and reference system 400' with an elongate support 410', a frame 420' and other features that are substantially similar—insofar as the structure and the operation are concerned—to features of the system 400 shown in FIGS. 31 and 32. Only the main manufacturing differences are herein briefly described. The frame 420' comprises a base portion 421' and a bridge-type structure, fixed to it, with two stanchion walls 422', 424' and a cross-piece 423'. One of the two walls 422' features a substantially L-shaped slit that defines thrust means with a portion 425' elastically movable with respect to the rest of the frame 420'.

The elongate support 410' defines lateral surfaces 411' and 412' intended to be arranged facing the walls 422' and 424' and comprises reference elements with three balls 413', 415' and 416' fixed to surfaces 411' and 412'. In particular, a couple of balls 415', 416' is arranged on one (412') of the surfaces near the ends of the elongate support 410', whereas the other ball 413' is arranged on the opposed surface 411' in a substantially centered position. The inner surface of stanchion wall 424' defines two V-shaped seats 435', 436', and the inner surface of wall 422' defines, in correspondence of the elastically movable portion 425', a conical seat 433'. A slot 428' is obtained in wall 424', and a limit threaded pin 408' is coupled to a threaded hole of support 410' in surface 412'. Slot 428' and threaded pin 408' are shown in dotted lines in FIG. 33 and are also shown in FIG. 34 even though they do not lie on the overall cross sectional plane of FIG. 34.

The support 410' is inserted at the interior of the bridge-type frame 420' and arranged in such a way that the balls 413', 415' and 416' house, respectively, in the conical seat 433' and in the V-shaped seats 435' and 436' and define a checking position of heads 1. At this position limit pin 408' is inserted in the slot 428' and screwed into the threaded hole in surface 412' of support 410'.

As in the case of the previously described support and reference systems 400, the position of the heads 1 is set and determined in an extremely simple, rapid and accurate way and the specific arrangement and the shape of the elements that achieve the coupling (in this case: balls 413', 415', 416' and relevant seats, elastically movable portion 425') enable the releasing of the support 410' from the frame 420' in case of accidental, potentially dangerous impacts. The presence of the pin 408' in the slot 428' limits the displacement and prevents the complete detaching between the frame 420' and the elongate support 410'. This enables on the one side to avoid damage to the heads 1 and on the other to facilitate and speed up the operations for the coupling between support 410' and frame 420' for bringing the heads 1 back to the determined checking position.

The apparatuses according to the invention can comprise just one head 1 coupled to support and reference systems 200, 250, 300, 300', 350, 400, 400' or 500 as those illustrated in the figures from 17 to 34. In fact, even in those applications that require the presence of just one head 1, the described and illustrated systems 200, 250, 300, 300', 350, 400, 400' or 500 offer the advantageous aspects previously described, especially insofar as the coupling simplicity and rapidity and the safety with respect to undesired impacts are concerned.

The heads and the apparatuses according to the invention can be utilized for both the "in-process" dimension checking of mechanical pieces, i.e. in the course of the machining of pieces in a machine tool (for example a grinding machine, as schematically illustrated in FIGS. 17, 19, 22, 24, 26, 27, 31 and 33), and the "post-process" checkings of pieces, i.e. after the machining.

The gauging or measuring heads and apparatuses according to the invention can differ with respect to what has been described and illustrated.

As far as the apparatuses described with reference to figures from 21 to 34 are concerned, the arrangement of the reference elements and the associated seats and/or abutment surfaces can be inverted with respect to coupling support and stationary structure.

The invention claimed is:

1. A head for the linear dimension checking of a mechanical piece including
    a support structure with a casing that defines a recess and a longitudinal geometric axis,
    an arm-set movable with respect to the support structure with
    an arm, at least partially housed in the recess, that defines an end portion, and
    a feeler, coupled to the arm, for touching a surface of the mechanical piece to be checked,
    a fulcrum, located between said arm and said support structure, for enabling displacements of said arm with respect to said support structure about a transversal axis,
    thrust devices located between the arm and the support structure for urging the feeler towards said surface of the piece to be checked,
    a transducer, coupled to said arm and said support structure, for providing signals depending on the position of said arm with respect to said support structure, and
    an adjustment device, coupled to the casing, with
    an abutment surface for touching said end portion of the arm, and
    an actuation element for adjusting the position of the abutment surface and causing or limiting rotational displacements of the arm about the transversal axis defined by the fulcrum.

2. The head according to claim 1, wherein said adjustment device includes a cylinder arranged at the exterior of the casing, an adjustable locating piston, housed in the cylinder, for defining said abutment surface, and a guide device, the actuation element and the guide device cooperating with said cylinder and with said locating piston for adjusting the position of said abutment surface by means of substantially translation displacements.

3. The head according to claim 2, wherein the cylinder defines an adjustment axis that is substantially parallel to said longitudinal geometric axis of the support structure, the position of the abutment surface being adjusted by means of displacements along said adjustment axis.

4. The head according to claim 1, wherein the position of the abutment surface is adjusted by means of displacements along an adjustment axis that is substantially parallel to said longitudinal geometric axis of the support structure.

5. The head according to claim 4, wherein said abutment surface is sloping with respect to said adjustment axis.

6. The head according to claim 5, wherein said abutment surface is adapted to translate along said adjustment axis for touching said end portion of the arm and urging the feeler away from the surface of the piece to be checked.

7. The head according to claim 5, wherein said abutment surface is adapted to translate along said adjustment axis for touching said end portion of the arm and urging the feeler towards the surface of the piece to be checked.

8. The head according to claim 1, wherein said adjustment device includes an electric motor coupled to the actuation element for adjusting the position of the abutment surface.

9. The head according to claim 8, including a processing unit for receiving and processing the signals sent by the transducer, wherein said electric motor is electrically connected to the processing unit, the processing unit sending actuation signals to the electric motor for setting the position of the abutment surface on the basis of the signals received from the transducer.

10. The head according to claim 9, wherein the transducer provides measuring signals when the feeler touches the piece to be checked, and the position of the abutment surface defines the position of the feeler under rest conditions and is dynamically set on the basis of said measuring signals received from the transducer.

11. The head according to claim 1, wherein the position of the abutment surface defines a position of the feeler under rest conditions.

12. The head according to claim 11, wherein the position of the feeler under rest conditions is dynamically set on the basis of the signals provided by said transducer.

13. The head according to claim 1, wherein the position of the abutment surface defines an inoperative position of the arm.

* * * * *

UNITED STATES PATENT AND TRADEMARK OFFICE
CERTIFICATE OF CORRECTION

PATENT NO.       : 7,076,882 B2                                    Page 1 of 1
APPLICATION NO.  : 11/152391
DATED            : July 18, 2006
INVENTOR(S)      : Carlo Dall'Aglio et al.

It is certified that error appears in the above-identified patent and that said Letters Patent is hereby corrected as shown below:

On the Title page, item (62): "Feb. 6, 1999" should be --Feb. 26, 1999--;

Column 1, line 12, "Feb. 6," should be --Feb. 26--;

Column 9, line 52, "xvay" should be --way--;

Column 12, line 28, "consequendy" should be --consequently--.

Signed and Sealed this

Nineteenth Day of December, 2006

JON W. DUDAS
*Director of the United States Patent and Trademark Office*